US008533177B2

(12) United States Patent
Huck et al.

(10) Patent No.: US 8,533,177 B2
(45) Date of Patent: Sep. 10, 2013

(54) MULTI-DATABASE QUERY SYSTEM AND METHOD

(75) Inventors: Bridget K. Huck, Wildwood, MO (US); Edwin R. Koenig, Jr., O'Fallon, MO (US); Diane Ediger Threlkeld, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 217 days.

(21) Appl. No.: 12/869,445

(22) Filed: Aug. 26, 2010

(65) Prior Publication Data

US 2011/0055231 A1    Mar. 3, 2011

Related U.S. Application Data

(60) Provisional application No. 61/237,510, filed on Aug. 27, 2009.

(51) Int. Cl.
*G06F 17/30* (2006.01)

(52) U.S. Cl.
CPC ............................. *G06F 17/30442* (2013.01)
USPC ............................. 707/713; 707/751; 707/774

(58) Field of Classification Search
USPC .................. 707/751, 774, 713, 769; 718/102
See application file for complete search history.

(56) References Cited

U.S. PATENT DOCUMENTS

| | | | |
|---|---|---|---|
| 5,721,900 A * | 2/1998 | Banning et al. ............... 707/713 |
| 5,987,452 A | 11/1999 | Kung | |
| 6,233,584 B1 | 5/2001 | Purcell | |
| 6,535,874 B2 | 3/2003 | Purcell | |
| 6,694,312 B2 * | 2/2004 | Kobayashi et al. ........... 707/769 |
| 6,807,539 B2 | 10/2004 | Miller et al. | |
| 7,085,757 B2 * | 8/2006 | Dettinger et al. ............. 707/769 |
| 7,222,130 B1 * | 5/2007 | Cras et al. .................... 707/803 |
| 7,266,764 B1 * | 9/2007 | Flam ............................. 715/209 |
| 7,340,480 B2 * | 3/2008 | Dettinger et al. ............. 707/805 |
| 7,418,441 B2 | 8/2008 | Hamel et al. | |
| 7,657,516 B2 | 2/2010 | Zaman et al. | |
| 7,945,597 B2 * | 5/2011 | Cras et al. .................... 707/803 |
| 2001/0049676 A1 | 12/2001 | Kepler et al. | |
| 2003/0050954 A1 | 3/2003 | Tayyar et al. | |
| 2004/0225603 A1 | 11/2004 | Allen et al. | |
| 2005/0043940 A1 * | 2/2005 | Elder ................................ 704/9 |
| 2005/0203887 A1 | 9/2005 | Joshi et al. | |
| 2006/0074881 A1 | 4/2006 | Vembu et al. | |

(Continued)

OTHER PUBLICATIONS

PCT/US10/46853 International Search Report and Written Opinion of the Searching Authority dated Oct. 21, 2010, 9 pages.

*Primary Examiner* — Shahid Alam
(74) *Attorney, Agent, or Firm* — Armstrong Teasdale LLP

(57) ABSTRACT

A system for retrieving data from a plurality of data sources is provided. The system includes a first data source for storing first data, a second data source for storing second data, and a server computer in communication with the first and second data sources. The server is programmed to receive a query execution request including a query definition reference and a query parameter definition wherein the query definition reference corresponds to a query definition that includes a first query block and a second query block, create a first executable query based on the first query block and the query parameter definition, create a second executable query based on the second query block and the query parameter definition, execute the first executable query at the first data source to create first query results, and execute the second executable query at the second data source to create second query results.

25 Claims, 24 Drawing Sheets

(56) References Cited

U.S. PATENT DOCUMENTS

| | | |
|---|---|---|
| 2006/0136449 A1 | 6/2006 | Parker et al. |
| 2006/0248058 A1 | 11/2006 | Feng |
| 2007/0011271 A1 | 1/2007 | Baker et al. |
| 2007/0043735 A1 | 2/2007 | Bodin et al. |

\* cited by examiner

MULTI-DATABASE QUERY SYSTEM AND METHOD

CROSS-REFERENCE TO RELATED APPLICATIONS

This application claims the priority of U.S. Provisional Patent Application Ser. No. 61/237,510, filed Aug. 27, 2009, which is incorporated herein by reference.

BACKGROUND OF THE INVENTION

The field of the present disclosure relates generally to a multi-database query system and method and, more particularly, a computer-based system and method for storing and managing queries within a centralized environment for execution in a plurality of databases wherein the databases utilize more than one query language.

Databases are used to store information for an innumerable number of applications, including various commercial, industrial, technical, scientific and educational applications. For example, at least some financial transactions are performed over computer networks wherein transaction data such as products being purchased, purchase amounts, account information, etc. is transmitted over the computer network and stored within one or more databases. More specifically, a consumer may purchase a product or service from a merchant using a transaction card (e.g., credit card or debit card) over a multi-party interchange network wherein the transaction data including the consumer's name, card number, product or service being purchased, amount being paid, etc. is transmitted over the interchange network and stored within a variety of databases. This stored data may then be used by various parties involved in the process for reporting purposes.

Historically, the use of "charge" or transaction cards or payment cards for consumer transaction payments was at most regional and based on relationships between local credit or debit card issuing banks and various local merchants. The transaction card industry has since evolved with the issuing banks forming associations or networks (e.g., MasterCard®) and involving third party transaction processing companies (e.g., "Merchant Acquirers") to enable cardholders to widely use transaction cards at any merchant's establishment, regardless of the merchant's banking relationship with the card issuer. (MasterCard is a registered trademark of MasterCard International Incorporated located in Purchase, New York).

For example, FIG. 1 of the present application shows an exemplary multi-party payment card industry system for enabling payment-by-card transactions in which the merchants and issuer do not need to have a one-to-one special relationship. In addition, various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others. As the payment card industry has evolved over the years, more and more consumers are using payment cards to purchase their goods and services. The more these cards are used, the more data that is processed and stored within the payment card systems. Parties involved in the payment process, such as an issuing bank, want to be able to retrieve and organize the data stored within the payment system.

As the reliance on such information increases, both the volume of information stored in most databases, as well as the number of users wishing to access that information, likewise increases. As the volume of information in a database increases, and the number of users wishing to access the database increases, the amount of computing resources required to manage such a database increases as well. Database management systems (DBMS's), which are computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware area, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables, and which are typically accessed using a standardized language such as Structured Query Language (SQL), has substantially improved processing efficiency, as well as substantially simplified the creation, organization, and extension of information within a database. However, despite the existence of a language standard, some databases support non-standard language in the interest of offering additional features. Significant development efforts have been directed toward query "optimization", whereby the execution of particular searches, or queries, is optimized in an automated manner to minimize the amount of resources required to execute each query. Some of these optimizations take advantage of non-standard language and thus produce query code that is not executable by other databases.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

In addition, for various reasons, including security and performance concerns, data produced by an organization often resides in multiple databases. Each of these databases is generally considered disconnected from the other databases and has its own "namespace". In such a case, a query executing in one database typically cannot access data stored in another database. Thus, the use of multiple, separate databases can also add an additional challenge to retrieving this data and creating reports from data that may be stored in different databases.

Many users require reports that include data stored in more than one database. Managing the creation, maintenance, and execution of multiple queries (one for each database) for a single user report introduces expense and duplication of logic in the queries. Further, generating a single report from queries in multiple databases can be difficult. While results from multiple queries may be sequentially appended to create a single report, a user may instead require a report based on an aggregation of data from multiple sources. For example, the user may require data from one source to be intermingled with data from another source, or the user may require a calculation based on data from more than one source.

Moreover, many queries require input parameters, such as a date range or a customer identifier. Accommodating these input parameters for one report across queries for multiple databases further increases the complexity and cost of report development and maintenance. Accordingly, a multi-language database query system is needed that prompts a user to input a plurality of parameter, generates a query using the parameters, and automatically deploys the query across multiple databases that support different languages so as to generate a report for the user.

BRIEF DESCRIPTION OF THE INVENTION

In one aspect, a system is provided for retrieving data from a plurality of data sources. The system includes a first data source for storing first data, a second data source for storing second data, and a server computing device in communication with the first data source and the second data source. The server computing device is programmed to receive a query execution request including a query definition reference and a query parameter definition. The query definition reference corresponds to a query definition that includes a first query block and a second query block. The server computing device is also programmed to create a first executable query based on the first query block and the query parameter definition, and to create a second executable query based on the second query block and the query parameter definition. The server computing device is further programmed to execute the first executable query at the first data source to create first query results and to execute the second executable query at the second data source to create second query results.

In another aspect, a method for retrieving data from a plurality of data sources is provided. The method uses a computer system that is in communication with a first data source and a second data source of the plurality of data sources. The method includes electronically retrieving a query definition that corresponds to a query definition reference wherein the query definition includes a first query block associated with the first data source and a second query block associated with the second data source, creating a first executable query based on the first query block and a query parameter definition, creating a second executable query based on the second query block and the query parameter definition, executing the first executable query against the first data source to create first query results, executing the second executable query against the second data source to create second query results, and storing the first and the second query results in a query results database.

In another aspect, a computer system for retrieving data from a plurality of data sources is provided. The computer system includes a first computer device, and a query database in communication with the first computer device. The query database is configured to store a plurality of query definitions. A first query definition of the plurality of query definitions comprises a first query block which includes a reference to a first data source and a second query block which includes a reference to a second data source. The computer system also includes a query service executed by the first computer device, wherein the query service is configured to instruct the first computer device to create a first executable query based at least in part on the first query block and a second executable query based at least in part on the second query block, execute the first executable query at the first data source to create first query results, and execute the second executable query at the second data source to create second query results. The computer system also includes a query results database configured to store the first query results and the second query results.

In another aspect, a computer-readable medium that includes computer executable instructions for retrieving data from a plurality of data sources is provided. The computer executable instructions are configured to instruct one or more computers to retrieve a query definition corresponding to a query definition reference wherein the query definition includes a first query block associated with a first data source of the plurality of data sources and a second query block associated with a second data source of the plurality of data sources, create a first executable query based on the first query block and a query parameter definition, create a second executable query based on the second query block and the query parameter definition, execute the first executable query against the first data source to create first query results, execute the second executable query against the second data source to create second query results, and create a formatted report based on the first query results, the second query results, and a formatted report definition associated with the query definition.

In another aspect, a system is provided for retrieving data from a plurality of data sources. The system includes a first data source for storing first data, a second data source for storing second data, and a computing device in communication with the first data source and the second data source. The computing device is programmed to receive a query execution request including a query parameter definition and a query definition reference, and to retrieve a query definition corresponding to the query definition reference. The query definition includes a first query block and a second query block. The computing device is also programmed to create a first executable query based on the first query block and the query parameter definition, and to create a second executable query based on the second query block and the query parameter definition. The computing device is further programmed to execute the first executable query at the first data source to create first query results and to execute the second executable query at the second data source to create second query results.

In another aspect, a method is provided for retrieving data from a plurality of data sources using a computer system that is in communication with a first data source and a second data source of the plurality of data sources. The method includes receiving a query execution request including a query parameter definition and a query definition reference. A query definition corresponding to the query definition reference is electronically retrieved. The query definition includes a first query block and a second query block. A first executable query is created based on the first query block and the query parameter definition. A second executable query is created based on the second query block and the query parameter definition. The first executable query is executed against the first data source to create first query results. The second executable query is executed against the second data source to create second query results. The first and the second query results are stored in a query results database.

BRIEF DESCRIPTION OF THE DRAWINGS

FIG. 15 is a screenshot of an exemplary user interface for viewing job entries from a job scheduler within the database query system.

FIG. 16 is a screenshot of an exemplary user interface for viewing and manipulating a job entry, including executable query details, within the database query system.

DETAILED DESCRIPTION OF THE INVENTION

Figure 1:
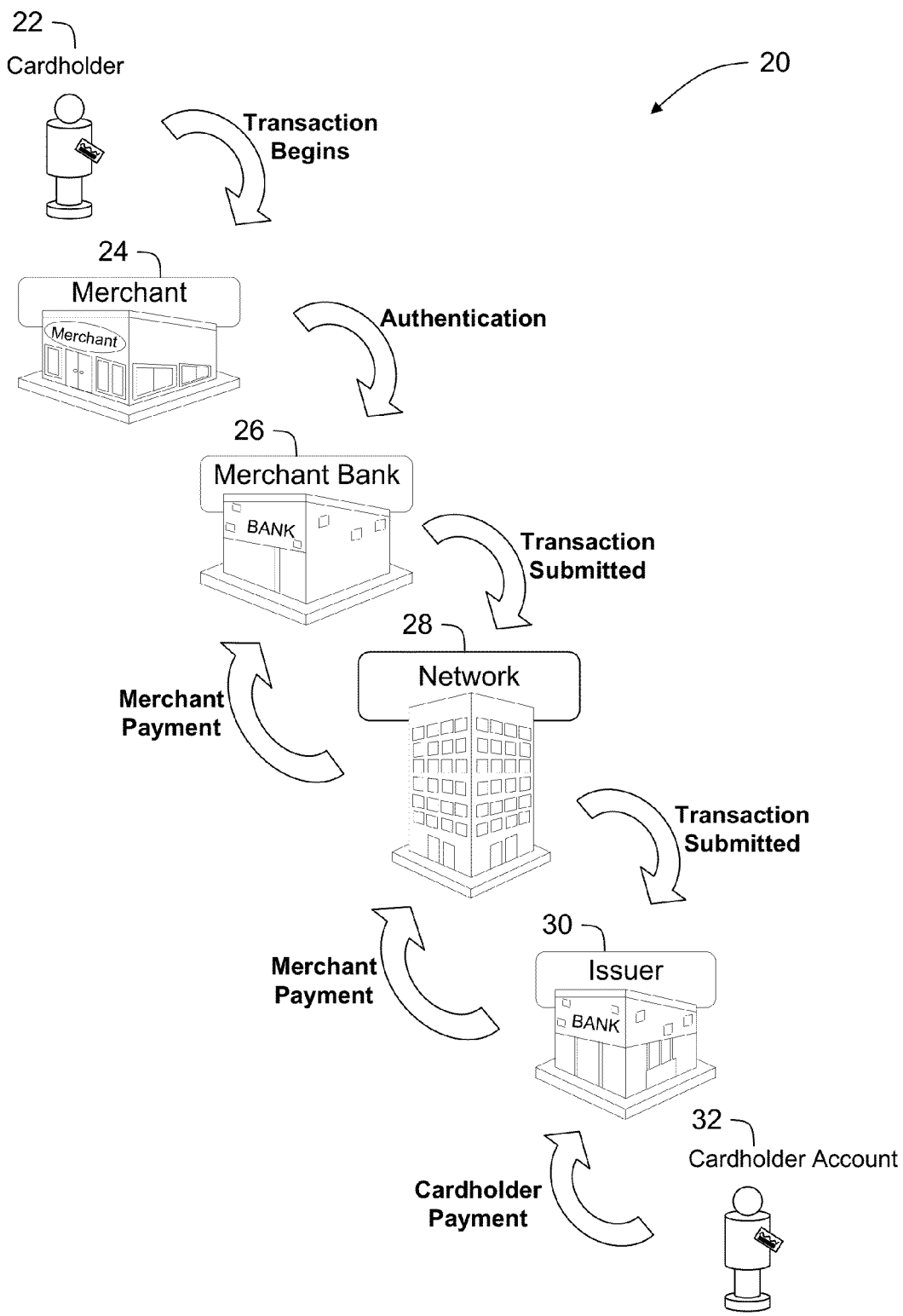
FIG. 1 is a schematic diagram illustrating an exemplary multi-party payment card industry system for enabling ordinary payment-by-card transactions in which the merchants and issuer do not need to have a one-to-one special relationship.

The methods and systems described herein relate to a database query system that is configured to prompt a user to input a plurality of parameters, generate one or more queries using the parameters, execute the queries in one or more databases, and process the results of the queries to create a formatted report for the user.

That database query system is in communication with a financial transaction card payment system, such as a credit card payment system using the MasterCard® interchange (MasterCard is a registered trademark of MasterCard International Incorporated located in Purchase, New York). The MasterCard® interchange is a proprietary communications standard promulgated by MasterCard International Incorporated® for the exchange of financial transaction data between financial institutions that have registered with MasterCard International Incorporated®.

A technical effect of the systems and processes described herein include at least one of (a) defining a query definition including at least one tokenized query, (b) defining parameter metadata for the query definition, (c) defining a query parameter definition based on the parameter metadata, (d) generating one or more executable queries based on the query definition and the query parameter definition, (e) executing the executable queries, and (f) generating a formatted report based on the results of the executed queries.

In one embodiment, a computer program is provided, and the program is embodied on a computer readable medium and utilizes a Structured Query Language (SQL) with a user interface front-end for administration and a report generator. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX server environment (UNIX is a registered trademark of AT&T New York, New York). The application is flexible and designed to run in various different environments without compromising any major functionality. In some embodiments, the system includes multiple components distributed among a plurality of computing devices. One or more components may be in the form of computer-executable instructions embodied in a computer readable medium.

The systems and processes are not limited to the specific embodiments described herein. In addition, components of each system and each process can be practiced independent and separate from other components and processes described herein. Each component and process also can be used in combination with other assembly packages and processes.

Embodiments described herein access data stored in one or more data sources or databases. The terms data source and database are used interchangeably herein. A data source may include, but is not limited to: database server software (e.g., ORACLE DATABASE, MICROSOFT SQL SERVER) executing on one or more computing devices; one or more structured files; one or more text files; binary data in one or more files; one or more serialized objects; and/or one or more data lookup services, such as a web service.

FIG. 1 is a schematic diagram 20 illustrating an exemplary multi-party payment card industry system for enabling ordinary payment-by-card transactions in which the merchants and issuer do not need to have a one-to-one special relationship. The present invention relates to a payment card system, such as a credit card payment system using the MasterCard® interchange network. The MasterCard® interchange network is a set of proprietary communications standards promulgated by MasterCard International Incorporated® for the exchange of financial transaction data and settlement of funds between financial institutions that are members of MasterCard International Incorporated®. (MasterCard is a registered trademark of MasterCard International Incorporated located in Purchase, New York).

In a typical payment card system, a financial institution called the "issuer" issues a payment card, such as a credit card, to a consumer, who uses the payment card to tender payment for a purchase from a merchant. To accept payment with the credit card, the merchant must normally establish an account with a financial institution that is part of the financial payment system. This financial institution is usually called the "merchant bank" or the "acquiring bank" or "acquirer bank." When a consumer 22 tenders payment for a purchase with a credit card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe, chip, or embossed characters on the credit card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor" or a "third party processor."

Using the interchange network 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge for a credit card transaction is not posted immediately to a consumer's account because bankcard associations, such as MasterCard International Incorporated®, have promulgated rules that do not allow a merchant to charge, or "capture," a transaction until goods are shipped or services are delivered. However, with respect to at least some debit card transactions, a charge may be posted at the time of the transaction. When a merchant ships or delivers the goods or services, the merchant captures the transaction by, for example, appropriate data entry procedures on the point-of-sale terminal. This may include bundling of approved transactions daily for standard retail purchases. If a consumer cancels a transaction before it is captured, a "void" is generated. If a consumer returns goods after the transaction has been captured, a "credit" is generated. The issuer bank 30 stores the credit card transaction information, such as the type of merchant, amount of purchase, date of purchase, in a data warehouse.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group. More specifically, a transaction is typically settled between the issuer and the interchange network, and then between the interchange network and the merchant bank (also known as the acquirer bank), and then between the merchant bank and the merchant.

Financial transaction cards or payment cards can refer to credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
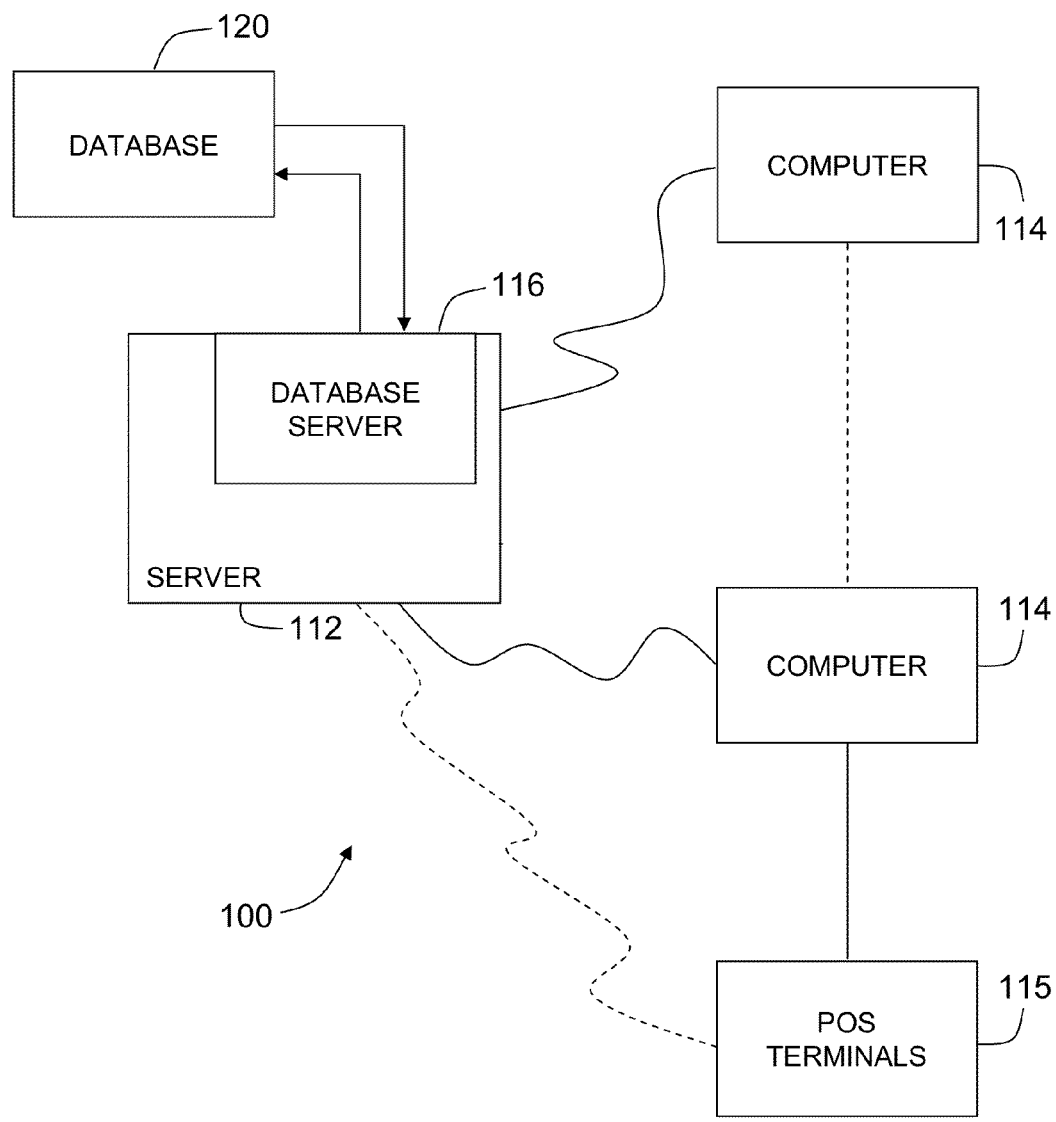
FIG. 2 is a simplified block diagram of an exemplary embodiment of a server architecture of a payment system for processing payment-by-card transactions, in accordance with one embodiment of the present invention.

FIG. 2 is a simplified block diagram of an exemplary payment system 100 for processing payment-by-card transactions, in accordance with one embodiment of the present invention. In one embodiment, system 100 is a payment card system, also referred to as a financial transaction payment system, used for storing transaction data of users, within a payment card program used by cardholder. In another embodiment, system 100 is a payment card system configured to process a transaction initiated by a cardholder using a payment card, determine whether the cardholder engaging in the transaction is registered within the system, store the data related to the transaction, authorize or deny the transaction, and complete the transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems and special high-speed ISDN lines. POS terminals 115 could be any device capable of interconnecting to the Internet and includes an input device capable of reading information from a consumer's financial transaction card.

As discussed herein, database 120 stores information relating to cardholders. Database 120 may also store transaction data generated as part of sales activities conducted over the bankcard network including data relating to merchants, account holders or customers, and purchases. Database 120 may also store data relating to merchants, account holders, customers, and purchases. Database 120 may also store data relating to a list of merchants, merchant identifiers, product codes, transaction terms, financing data, and any other data related to operation of system 100. Database 120 may include a single database having separated sections or partitions or may include multiple databases, each being separate from each other.

In the example embodiment, one of client systems 114 may be associated with an acquirer while another one of client systems 114 may be associated with an issuer; POS terminal 115 may be associated with a participating merchant or may be a computer system used by a customer making an on-line purchase or payment; and server system 112 may be associated with the interchange network.

Figure 3:
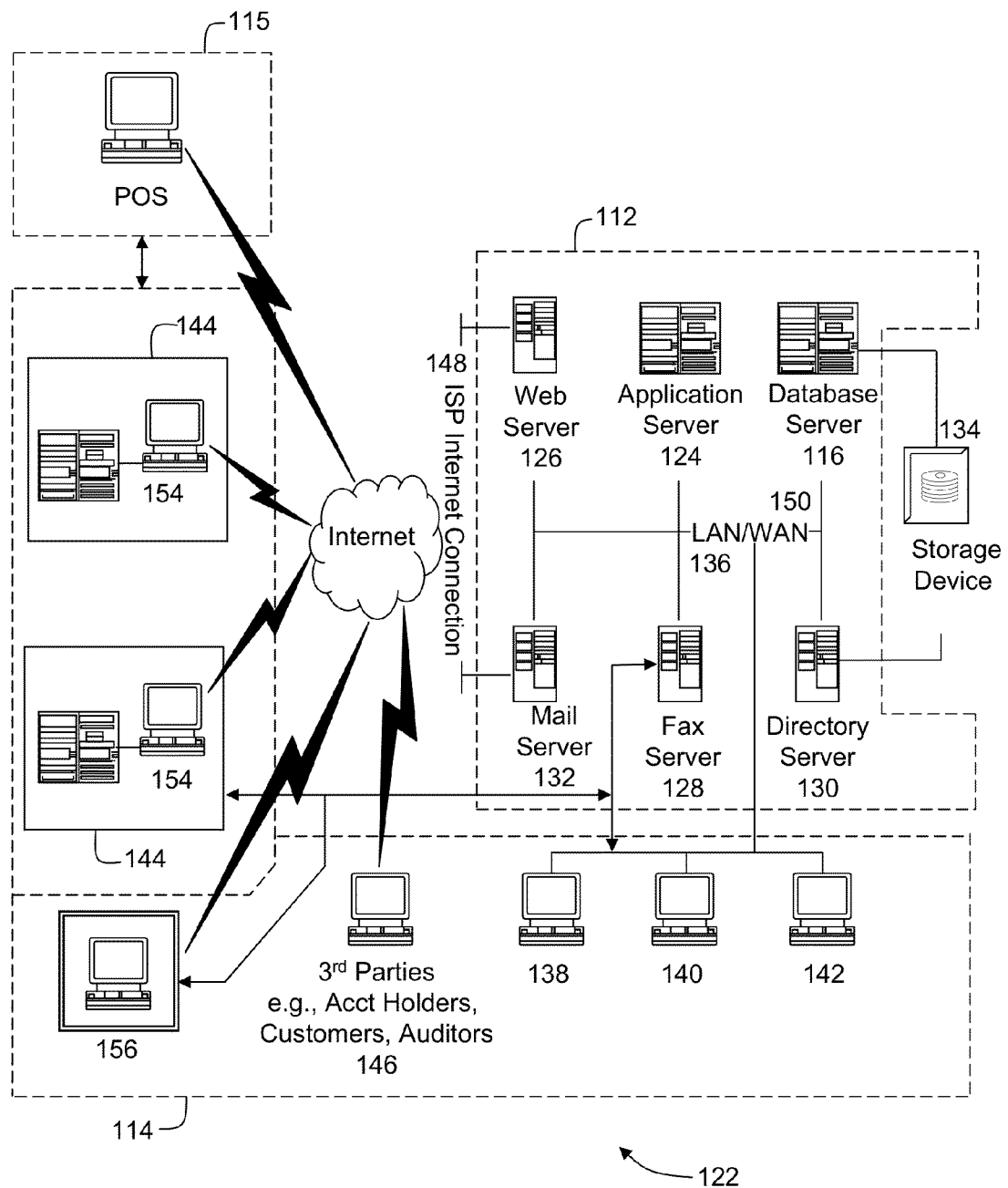
FIG. 3 is an expanded block diagram of an exemplary embodiment of a server architecture of a payment system, in accordance with one embodiment of the present invention.

FIG. 3 is an expanded block diagram of an exemplary embodiment of a server architecture of a payment system 122 for processing payment-by-card transactions, in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 115. Server system 112 further includes database server 116, an application server 124, a web server 126, a fax server 128, a directory server 130, and a mail server 132. A storage device 134 is coupled to database server 116 and directory server 130. Storage device 134 is any computer-operated hardware for storing and/or retrieving data. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
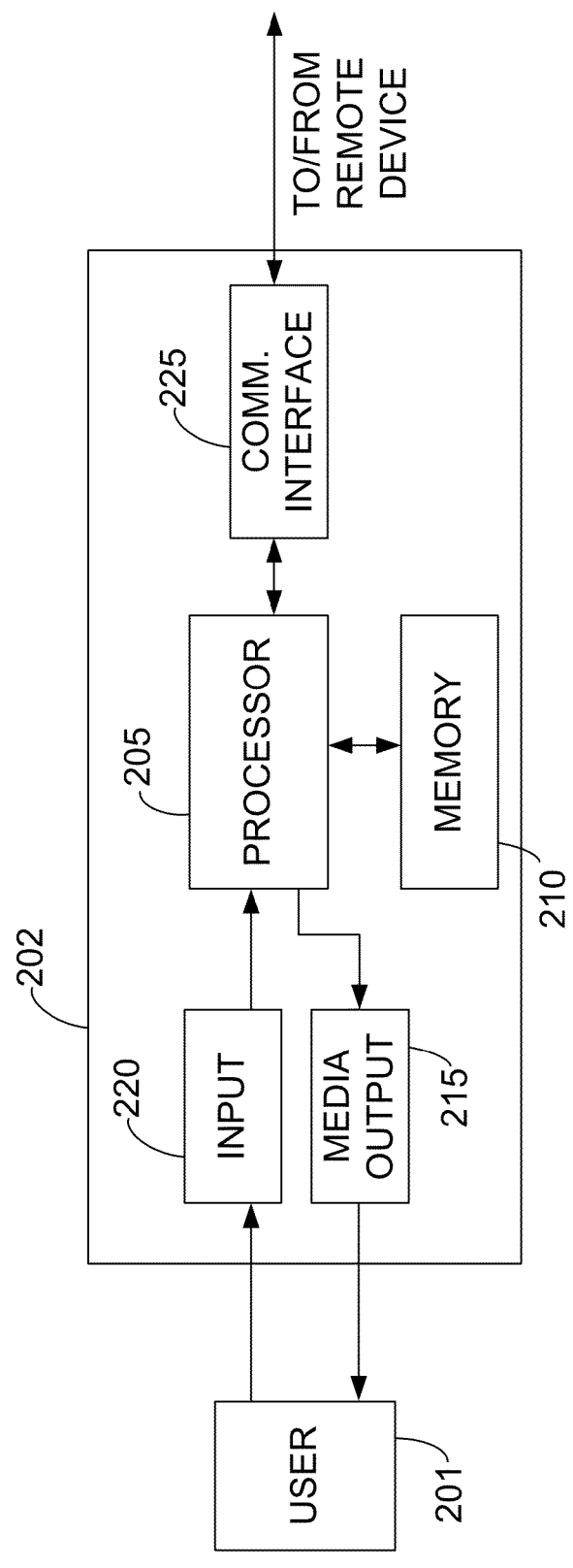
FIG. 4 illustrates an exemplary configuration of a client system shown in FIGS. 2 and 3.

FIG. 4 illustrates an exemplary configuration of a user computing device 202 operated by a user 201. User computing device 202 may include, but is not limited to, client systems 114, 138, 140, and 142, POS terminal 115, workstation 154, and manager workstation 156.

User computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or written works to be stored and retrieved. Memory area 210 may include one or more computer readable media.

User computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computing device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
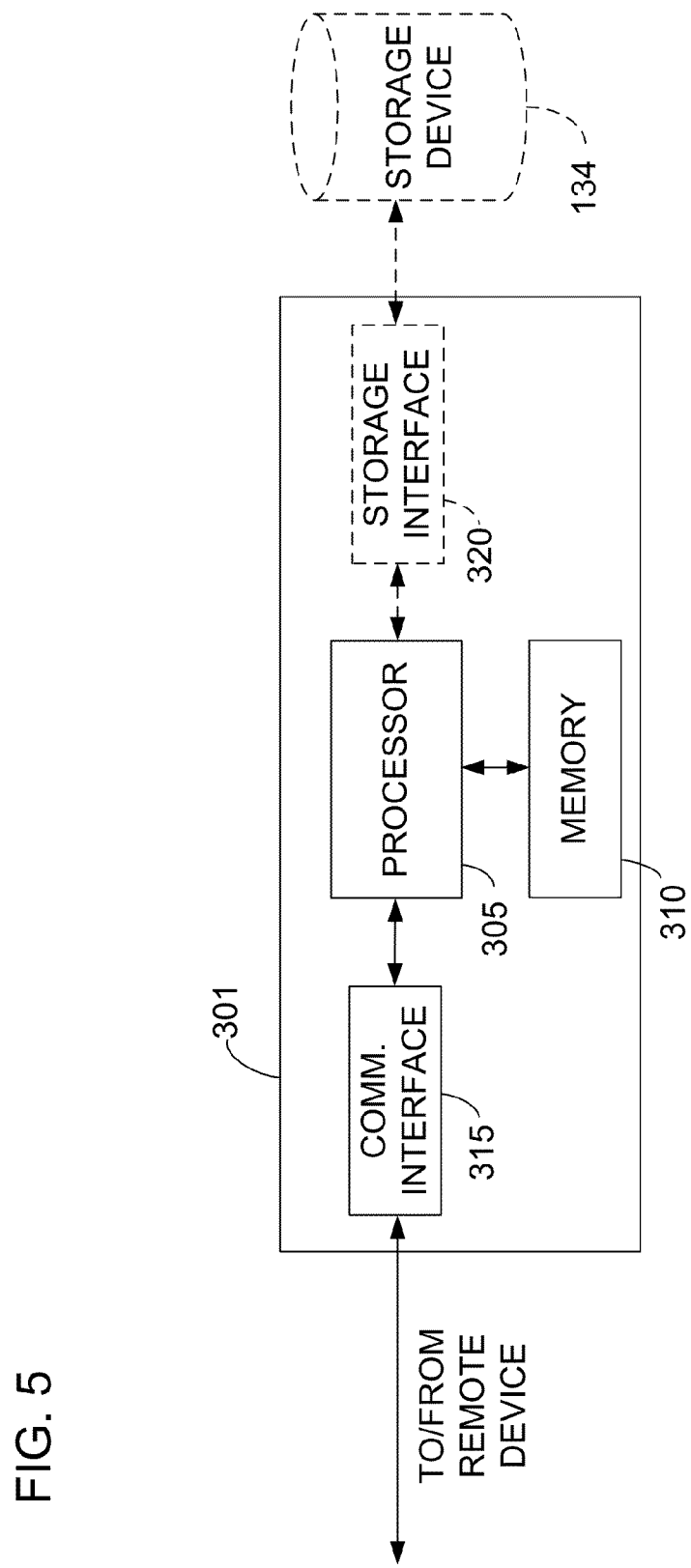
FIG. 5 illustrates an exemplary configuration of a server system shown in FIGS. 2 and 3.

FIG. 5 illustrates an exemplary configuration of a server computing device 301 such as server system 112 (shown in FIG. 2). Server computing device 301 may include, but is not limited to, database server 116, application server 124, web server 126, fax server 128, directory server 130, and mail server 132.

Server computing device 301 also includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computing device 301 is capable of communicating with a remote device such as user computing device 202 or another server computing device 301. For example, communication interface 315 may receive requests from user computing device 114 via the Internet, as illustrated in FIG. 3.

Processor 305 may also be operatively coupled to a storage device 134. Storage device 134 is any computer-operated hardware suitable for storing and/or retrieving data. In some embodiments, storage device 134 is integrated in server computing device 301. For example, server computing device 301 may include one or more hard disk drives as storage device 134. In other embodiments, storage device 134 is external to server computing device 301 and may be accessed by a plurality of server computing devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Figure 6:
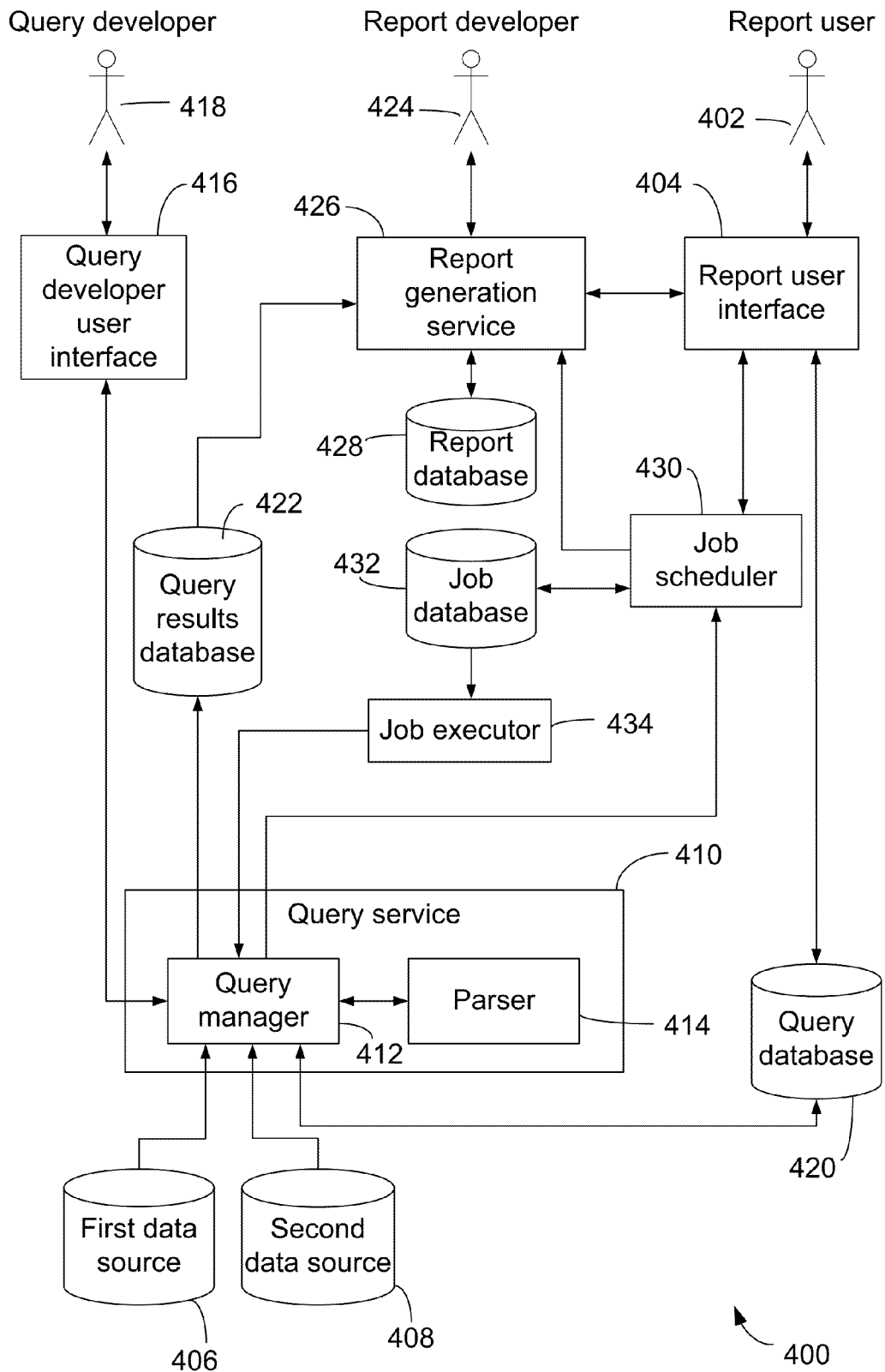
FIG. 6 is a block diagram of an exemplary embodiment of a database query system in connection with the payment system shown in FIG. 3, in accordance with one embodiment of the present invention.

FIG. 6 is a block diagram showing an exemplary database query system 400 used in connection with payment system 100 (shown in FIG. 2). Specifically, database query system 400 is configured to access data stored in database 120 of payment system 100.

System 400 is designed to provide formatted reports for a report user 402 via a report user interface 404. The data required for the report is contained in a first data source 406 and a second data source 408. In the example embodiment, first data source 406 and second data source 408 may include database 120. System 400 includes a query service 410 for retrieving data from first data source 406 and second data source 408. Query service 410 includes a query manager 412 and a parser 414. Query manager 412 receives query data from a query developer user interface 416, which is operated by a query developer 418. Query data includes, but is not limited to, at least one query definition. Query manager 412 stores the query data in a query database 420. Query developer 418 may also access existing query data via query developer user interface 416, which retrieves query data from query manager 412.

In an exemplary embodiment, a query definition includes one or more query blocks. Each query block includes a tokenized query and a reference to a data source for the tokenized query. Multiple data sources may be accessed using a single query definition containing multiple query blocks. A tokenized query is not directly executable by a database, as it includes one or more control tokens.

To facilitate query execution, query manager 412 provides a query definition and a query parameter definition to parser 414. Parser 414 identifies each query block in the query definition. For each query block, parser 414 identifies control tokens within the query block and produces an executable query based on the tokenized query and the query parameter definition. In some embodiments, first data source 406 and second data source 408 are associated with different syntaxes. Accordingly, parser 414 may generate a query block based further on a syntax associated with the corresponding data source.

Control tokens include, for example, but are not limited to, comment tokens, definition tokens, substitution tokens, condition tokens, iteration tokens, parameter tokens, and object reference tokens. A control token may be preceded, followed, or surrounded by predefined characters (e.g., preceded by "</x" and followed by ">") to distinguish it from conventional, non-token content.

A comment token designates content (e.g., descriptive text) that has no effect on the function of the query. In one embodiment, parser 414 translates the content designated by a comment token into a format recognizable by a database as a comment. For example, parser 414 may add to the content a prefix of the string "/*" and a suffix of the string "*/". In another embodiment, parser 414 simply omits the content designated by the comment token from the executable query.

Definition tokens and substitution tokens are used in conjunction with each other. A definition token includes an identifier and associates content with the identifier. A substitution token includes a reference to the identifier and designates a location in a query definition at which to incorporate the content associated with the identifier. Parser 414 identifies content corresponding to a definition token. Rather than including the content in the executable query according to its location in the query definition, parser 414 substitutes the content for any substitution token referencing the identifier of the definition token. For example, a query clause may be defined near the beginning or the end of a query definition using a definition token with an identifier of "Clause1", and the clause may be incorporated by reference at one or more appropriate locations within the query definition by the existence of a substitution token referencing "Clause1" (e.g., "</xreference=Clause1>").

A condition token designates content to be included in a query according to a specified condition, which optionally includes a parameter token referencing a value from the query parameter definition. Parser 414 evaluates the condition and includes the content only if the condition is met, treating the condition as a logical "if" clause. A condition may be expressed as a compound condition including multiple conditions, either in a conjunctive manner (i.e., a logical "and" operation), in which case parser 414 includes the content only if all of the specified conditions are met, or in a disjunctive manner (i.e., a logical "or" operation), in which case parser 414 includes the content if any of the specified conditions are met. An alternative condition token may be provided for any conditional token to designate content to be included if the condition of the condition token is not met. Parser 414 treats an alternative condition token as a logical "else" clause. An alternative condition token may include a further condition, similar to a logical "else if" clause. Multiple alternative condition tokens may be provided for a condition token, though all but one alternative condition token should include a further condition. Parser 414 treats a condition token with multiple alternative condition tokens as a logical "if/else if/else if/else" clause.

An iteration or "loop" token designates content to be included in an executable query zero to many times. An iteration token includes a reference to a collection of values. The reference to the collection of values may include, but is not limited to, a parameter token referencing an array or other collection from the query parameter definition, a collection of literal strings included with the iteration token, and/or a series of numeric values within a range specified in the iteration token. The content designated by the iteration token may include one or more instances of an iteration variable token. An iteration variable token may be a predefined token (e.g., "CurrentValue") or may be specified in the iteration token. For example, an iteration token intended to include a query for each of multiple countries may include an iteration variable token "Country".

Parser 414 evaluates the reference to the collection of values. For each individual value in the collection, parser 414 includes one copy of the designated content in the executable query, substituting the individual value for all instances of an iteration variable token. For example, given an iteration token with a reference to a collection of values "('UK', 'US')" and an iteration variable token of "Country", parser 414 includes a first copy of the content, replacing every occurrence of the token "Country" (or "</xCountry>") with the string "'UK'"

and then includes a second copy of the content, replacing every occurrence of the token "Country" (or "</xCountry>") with the string 'US'.

A parameter token designates a position in the content at which to include a value from the query parameter definition. A parameter token (e.g., "</xparm[RequestedMonthID]>") includes a reference to a value in the query parameter definition. Parser 414 evaluates the reference and replaces the parameter token with the value. Parser 414 thus processes a parameter token similarly to a substitution token, but a substitution token references content within the query definition, whereas a parameter token references a value in the query parameter definition.

A parameter token may reference a value in the query parameter definition that includes either an individual value or a collection of individual values, such as a list. In the exemplary embodiment, given a reference to a collection, parser 414 replaces the parameter token with each individual value from the collection, delimited by commas. A parameter token referencing collection may be used in conjunction with an SQL "IN" clause, for example. For a parameter token referencing a collection containing the numeric values 123, 456, and 789, parser 414 replaces the parameter token with the string "123, 456, 789". To accommodate alphabetic and/or alphanumeric values, a quoting parameter token may be supported. In the exemplary embodiment, parser 414 replaces a quoting parameter token with each individual value from the referenced query parameter definition value, surrounded by quotation marks and delimited by commas. For example, for a quoted parameter token of "</xparmTic[Countries]>" and a collection of the values "USA", "GBR", and "ALB" for the value "Countries" in the query parameter definition, parser 414 replaces the quoted parameter token with the string "'USA', 'GBR', 'ALB'".

An object reference token includes a reference to an object accessible to parser 414 and a reference to a member (e.g., an attribute or a method) of the object. In the exemplary embodiment, an object reference token includes a name of and/or a path to an executable object (e.g., a shared library, such as a dynamic-link library) residing on the same host as parser 414 and a name of a member of the executable object. Parser 414 recognizes an object reference token and locates the referenced executable object. Parser 414 accesses the executable object, such as by opening, loading, or instantiating, and locates the referenced member. If the member is an attribute, parser 414 replaces the object reference token with the value or values of the attribute. If the member is a method, parser 414 invokes the method and replaces the object reference token with a return value or return values produced by the invocation. In some embodiments, an object reference token with a method reference includes one or more input parameters, which parser 414 uses as input parameters when invoking the referenced method.

Tokens may be included or "nested" within content associated with another token. For example, content associated with a definition token may include a condition token and/or a parameter token.

Query manager 412 provides a query execution service (e.g., as a Hypertext Transport Protocol-based web service). Query manager 412 receives a query execution request via the query execution service. A query execution request includes a query parameter definition and a reference to a query definition. In response to the request, query manager 412 retrieves from query database 420 the query definition referenced by the request and provides the query definition and the query parameter definition to parser 414. Parser 414 generates one or more executable queries based on the query definition and the query parameter definition. Each executable query is associated with a data source (e.g., first data source 406 or second data source 408). Query manager 412 executes each of the queries in the associated data source and stores the results of each query in a query results database 422.

Invocation of the query execution service provided by query manager 412 may be accomplished manually or automatically. In the exemplary embodiment, to facilitate automated invocation, a report developer 424 creates parameter metadata for a query definition using a report generation service 426. The parameter metadata includes a parameter description for each parameter token in the query definition. Each parameter description includes one or more parameter attributes. Parameter attributes include, but are not limited to, a parameter title, an identifier of the parameter token from the query definition, a parameter group, a visibility indicator (e.g., visible or invisible), a prompt label, a value type (e.g., string or Boolean), a value quantity (e.g., a single value or multiple values), and an indication of available values. In some embodiments, one or more parameter attributes are encoded in another parameter attribute. For example, a parameter title may be structured to indicate a parameter group and a value quantity. Report generation service 426 stores the parameter metadata in a report database 428.

Report developer 424 also creates a formatted report definition based on the query definition. The formatted report definition references query results to be stored in query results database 422 by query manager 412. Report generation service 426 may include a user interface for creating a formatted report definition. In addition, or alternatively, report developer 424 may create the formatted report definition using a text editor or a report development tool, such as MICROSOFT VISUAL STUDIO, and provide the formatted report definition to report generation service 426. Report generation service 426 stores the formatted report definition in report database 428. Query developer 418, who may be the same person as report developer 424, associates the formatted report definition with the query definition using query developer user interface 416. Query developer user interface 416 submits the association between the formatted report definition and the query definition to query manager 412, which stores the association in query database 420. For example, query manager 412 may associate a name or other identifier of the formatted report definition with the query definition in query database 420.

With the query definition, the parameter metadata, and the formatted report definition created, the report is ready for configuration and execution by report user 402. Report user 402 interacts with report user interface 404 to identify a formatted report definition that report user 402 wishes to execute. Report user interface 404 requests a list of available formatted report definitions for report user 402 from report generation service 426. Report generation service 426 retrieves a list of formatted report definitions for report user 402 from report database 428. Report user 402 may have access to only a subset of all formatted report definitions in report database 428. Access to formatted report definitions may be restricted based on a role or a user type of report user 402 and/or a contract specifying which formatted report definitions report user 402 may access. Formatted report definitions may be organized into groups (e.g., "Business Overview", "Cardholder Spend") and further into subgroups within a group. Report user 402 may be granted access to individual formatted report definitions and/or groups or subgroups of formatted report definitions. Similarly, users may be grouped by business organization and/or by role or user type. For example, a client may enter into a contract providing access to formatted report definitions in the group "Business Overview" for all of its users.

Report generation service 426 returns the list of available formatted report definitions to report user interface 404, which displays the list to report user 402, optionally by group and/or subgroup. Report user 402 selects a formatted report definition. In response, report user interface 404 displays a report configuration interface based on the parameter metadata associated with the formatted report definition. In one embodiment, report user interface 404 requests parameter metadata from report generation service 426 in response to report user 402 selecting the formatted report definition. Report generation service 426 retrieves the parameter metadata from report database 428 and returns the parameter metadata to report user interface 404. In an alternative embodiment, report generation service 426 retrieves parameter metadata for each formatted report definition when it retrieves formatted report definitions for report user 402. Report generation service 426 includes the parameter metadata with each formatted report definition, and report user interface 404 simply displays a report configuration interface based on the corresponding parameter metadata when report user 402 selects a formatted report definition.

The report configuration interface displayed by report user interface 404 includes fields for parameter descriptions from the parameter metadata, a scheduling control, an option to execute the displayed report configuration, and an option to save the displayed report configuration. In the exemplary embodiment, report user interface 404 displays a prompt label (e.g., "Select Merchant Classification:") from the parameter description and a value entry control (e.g., a free-form text field or a drop-down list) based on a value type, a value quantity, and/or an indication of available values from the parameter description. In an exemplary embodiment, each of the parameter descriptions includes a visibility indicator and a parameter group; report user interface 404 groups fields based on parameter groups from the parameter descriptions and displays fields only for parameter descriptions having a visibility indicator of visible.

Report user 402 uses the value entry controls to specify a parameter value or parameter values for the displayed fields and, optionally, uses the scheduling control to specify a schedule for executing the report configuration once or on a recurring basis. If report user 402 elects to execute the report configuration or to save the report configuration, report user interface 404 creates a query parameter definition including the parameter values. Report user interface 404 stores the query parameter definition and, optionally, the report configuration from the report configuration interface to query database 420, thus making the query parameter definition available to query manager 412.

If report user 402 elects to execute the report configuration, report user interface 404 submits a report execution request to a job scheduler 430, including a reference to the formatted report definition and a reference to report user 402 and specifying immediate execution. In response to receiving the report execution request, job scheduler 430 stores a job entry in a job database 432, scheduled for immediate execution. If report user 402 elects to save the report configuration with a schedule specified, report user interface 404 submits a report execution request to job scheduler 430, including references to the formatted report definition and to report user 402 and specifying the execution schedule. Job scheduler 430 stores a job entry in job database 432 for each execution in the specified execution schedule. Each job entry includes the reference to the formatted report definition and the reference to report user 402.

In some embodiments, job database 432 is read periodically (i.e., "polled") by a job executor 434. In one embodiment, job executor 434 is a job configuration in an automated execution facility provided by an operating system. Job executor 434 queries job database 432 to identify jobs for execution at or near the time of the query. For each identified job, job executor 434 submits a query execution request to query manager 412, including the formatted report definition reference and the reference to report user 402 from the identified job.

Query manager 412 maintains one or more query execution queues, each of which operates on a first-in, first-out ("FIFO") basis to ensure queries are executed in the order requested. In response to receiving a query execution request, query manager 412 creates a query execution entry in the query execution queue. When query manager 412 becomes available to process a query execution entry, it removes the oldest query execution entry from the query execution queue. In the exemplary embodiment, query manager 412 processes multiple query execution entries in parallel. The quantity of query execution entries concurrently processed by query manager 412 is configurable while query manager 412 is executing. In some embodiments, query developer 418 modifies the quantity of concurrently processed query execution entries via query developer user interface 416, and query developer user interface 416 transmits the new quantity to query manager 412. The quantity is stored in query database 420 or a storage device accessible by query manager 412.

In some embodiments, query manager 412 maintains a plurality of query execution queues. One or more query execution queues may be defined for each data source. Each query execution queue is associated with an execution priority level. For example, a query manager 412 may provide a low priority queue, a normal priority queue, and a high priority queue. In one embodiment, queries submitted to the high priority queue are executed with a resource allocation (e.g., processor time and/or disk access) that is greater than the resource allocation provided to a query in the low priority or normal priority queue. For example, query manager 412 may directly allocate resources to a query. In addition, or alternatively, query manager 412 may request a greater or lower resource allocation from first data source 406 and/or second data source 408 when executing a query.

A "weight" may be associated with each query execution queue. A weight represents a quantity of query execution entries within a queue that may be processed concurrently. For example, for a query execution queue with a weight of two, query manager 412 may execute queries in the query execution queue on a FIFO basis, with up to two queries executing concurrently.

Providing a plurality of query execution queues facilitates increasing overall execution performance by reducing the amount of time query manager 412, first data source 406, and/or second data source 408 are idle. In one example, query developer 418 assigns queries known to access large amounts of data to a low priority queue and assigns queries known to access relatively smaller amounts of data to a high priority queue. While a single large-data query executes at low priority, a plurality of small-data queries may be initialized, executed, and completed. Accordingly, reports associated with only small-data queries may be executed quickly with no significant effect on the execution speed of reports associated with one-or-more large-data queries.

Query manager 412 processes a query execution entry by retrieving a query definition from query database 420 based on the formatted report definition reference in the query execution entry. Query manager 412 also retrieves the report configuration created by report user 402 from query database 420 based on the formatted report definition reference and the reference to report user 402 from the query execution entry.

Query manager 412 provides the query definition and the query parameter definition from the report configuration to parser 414. Based on the query definition and the query parameter definition, parser 414 creates an executable query for each query block in the query definition and returns the executable queries to query manager 412. Each executable query is associated with the data source corresponding to the query block from which it was generated.

Query manager 412 executes each of the executable queries in its corresponding data source and stores the results of each executable query in query results database 422. In the exemplary embodiment, query manager 412 creates a results table in query results database 422 with column names based on metadata associated with the results of an executable query and/or based on column names or aliases specified in a "select" clause of the executable query. The query definition optionally includes a results combination attribute indicating whether results from each query should be concatenated or stored separately. If the results combination attribute indicates concatenation, query manager 412 stores the results from all executable queries in the query definition in a single table in query results database 422. If the results combination attribute indicates separate storage, queue manager 412 stores the results for each executable query in a separate table in query results database 422. In the exemplary embodiment, if no results combination attribute is specified, query manager 412 stores the results in separate tables.

In some embodiments, prior to executing one or more queries in a query definition, query manager 412 determines whether report user 402 is authorized to execute the query or queries in the query definition. For example, query manager 412 may retrieve a collection of privileges for report user 402 from query database 420 or an authorization system. If query manager 412 determines report user 402 is authorized to execute the query or queries, it proceeds with execution. If query manager 412 determines report user 402 is not authorized, it terminates processing of the query execution entry. Query manager 412 may report an authorization failure to job scheduler 430 and/or a security system.

In one embodiment, query manager 412 executes a plurality of executable queries generated from the query definition in parallel (i.e., concurrently). For example, query manager 412 may execute three queries in parallel, with each query accessing a different data source. Parallel execution of queries facilitates reducing the total execution time for a given query execution entry.

After query manager 412 stores query results in query results database 422, it submits a job completion notification to job scheduler 430, including references to the formatted report definition and report user 402. In response to the job completion notification, job scheduler 430 submits a report generation request to report generation service 426, including the references to the formatted report definition and report user 402.

In response to receiving the report generation request, report generation service 426 retrieves the formatted report definition from report database 428 based on the formatted report definition reference from the report generation request. Report generation service 426 executes the formatted report definition, using the query results in query results database 422 as input and generating a formatted report object as output. Report generation service 426 stores the formatted report object in report database 428 and creates a report completion notice in a message inbox for report user 402 based on the formatted report definition and the reference to report user 402 from the report generation request.

Report user interface 404 periodically accesses the message inbox for report user 402 via report generation service 426 to identify any new report completion notices for report user 402. If report user 402 is accessing report user interface 404 when report user interface 404 identifies a new report completion notice, report user interface 404 displays a graphical notification to report user 402, indicating that a report has been generated. In one embodiment, if report user 402 is not accessing report user interface 404 when a new report completion notice is identified, report user interface 404 transmits an email message to report user 402 indicating that a report has been generated.

Report user 402 accesses a report list using report user interface 404. Report user interface 404 retrieves a list of reports for report user 402 from report generation service 426 and displays the list of reports. Report user 402 selects a report from the list. In response, report user interface 404 presents to report user 402 a report view interface from report generation service 426. Report generation service 426 generates the report view interface by retrieving the formatted report object corresponding to the selected report from report database 428 and presenting the formatted report object in graphical form for display to report user 402. The report view interface includes controls allowing report user 402 to view the presented report, print the presented report, and/or save the presented report to report user's 402 computing device as a file or files (e.g., in portable document format (PDF), extensible markup language (XML), or plain text).

In an exemplary embodiment, query developer 418, report developer 424, and report user 402 access system 400 via client computing devices, such as client computing device 202. Query developer user interface 416, report generation service 426, and report user interface 404 are each provided by one or more server computing devices 310. Other components, including job scheduler 430, job executor 434, and query service 410 are also provided by server computing devices 301. Query database 420, query results database 422, report database 428, and job database 432 are each contained in a storage device 134 and may be accessed by client computing devices 202 and/or server computing devices 301 directly or via one or more database servers 116.

In some embodiments, after creation of the formatted report, the query results are purged from query results database 422. In the exemplary embodiment, query manager 412 submits a job completion notification to job scheduler 430 and waits ("blocks") for a response. Similarly, job scheduler 430 submits a report generation request to report generation service 426 and waits for a response. Report generation service 426 creates a formatted report using the query results and responds to job scheduler 430 with a success response. Job scheduler, 430, in turn, responds to query manager 412 with a success response, and query manager 412 deletes the query results from query results database 422. If an error occurs during generation of the formatted report, report generation service 426 responds to job scheduler 430 with an error response, and job scheduler responds to query manager 412 with an error response. Query manager 412 leaves the query results in query results database 422. The query results may be used for technical support purposes.

In an alternative embodiment, query results are deleted based on a threshold age. For example, query manager 412 may periodically delete query results older than a threshold age (e.g., twenty-four hours or one week). In addition, or alternatively, query results database 422 may perform this deletion.

In some embodiments, formatted reports are purged from report database 428 based on a threshold age. For example, report database 428 and/or report generation service 426 may periodically delete formatted reports older than a threshold age.

Figure 7:
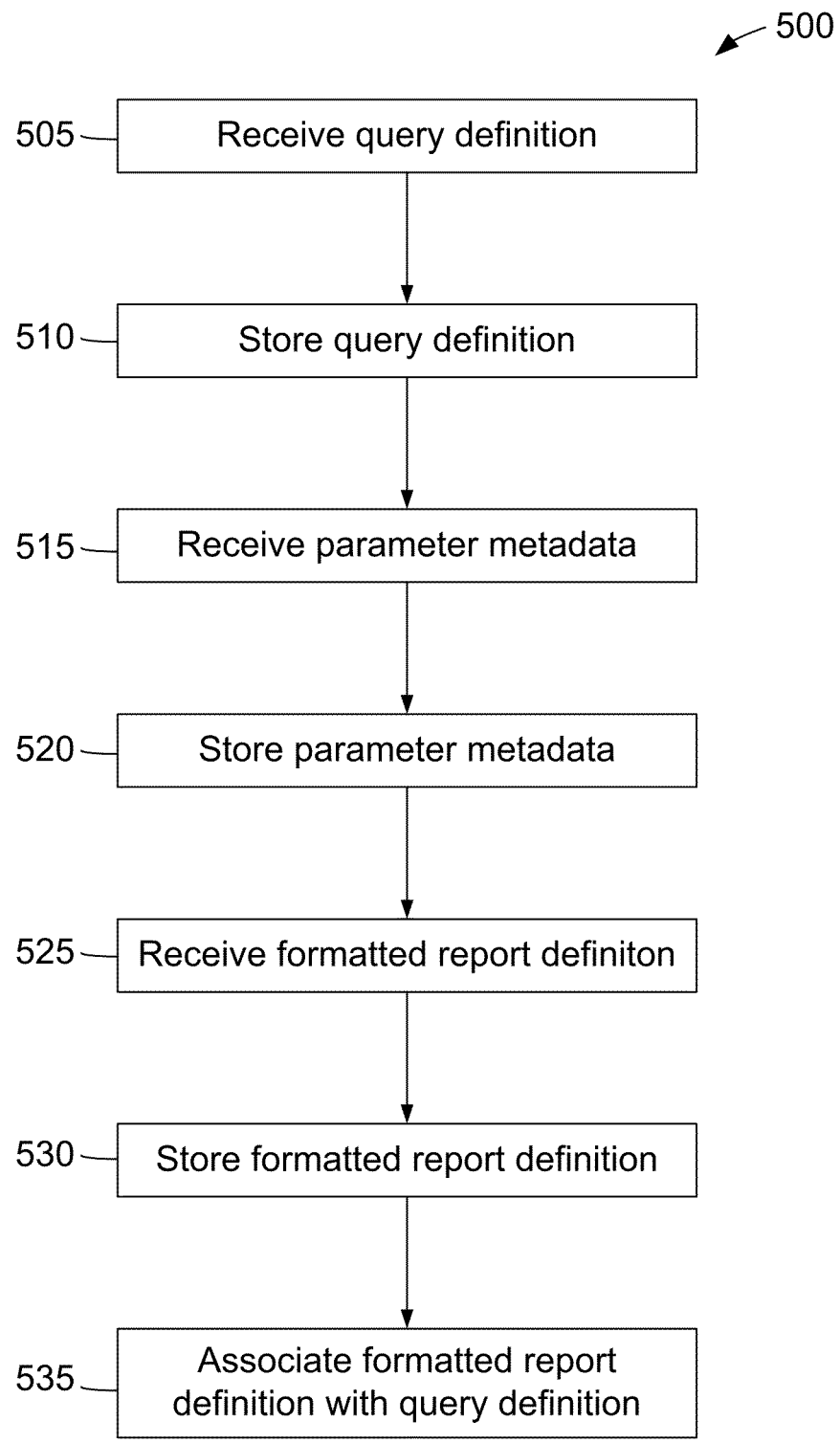
FIG. 7 is a flowchart of an exemplary process for making a report available to a report user using the database query system.

FIG. 7 is a flowchart of an exemplary process 500 for making a parameterized report available using database query system 400 (shown in FIG. 6). Process 500 includes receiving 505, by a first computing device, a query definition including at least one tokenized query having at least one control token and storing 510 the query definition in a first database. For example, the query definition may be a structured document, such as an extensible markup language (XML) or XML-like document, and the control token may be a string within the document that is formatted or delimited to be recognizable as a control token. In some embodiments, a control token is or includes a parameter token having a numeric, alphabetic, or alphanumeric identifier. The query definition also includes a reference to a data source against which each tokenized query is to be executed. Each tokenized query is written to produce query result data when converted into executable form and executed against the corresponding data source.

Parameter metadata for the query definition is received 515 by a second computing device and stored 520 in a second database. The parameter metadata includes a parameter description for each parameter token in the query definition. Each parameter token thus has a corresponding parameter description.

A formatted report definition is received 525 by the second computing device and stored 530 in the second database. The formatted report definition references at least a portion of the query result data to be produced by the tokenized query(ies) of the query definition. The formatted report definition is associated 535 with the query definition in the first database.

Figure 8A:
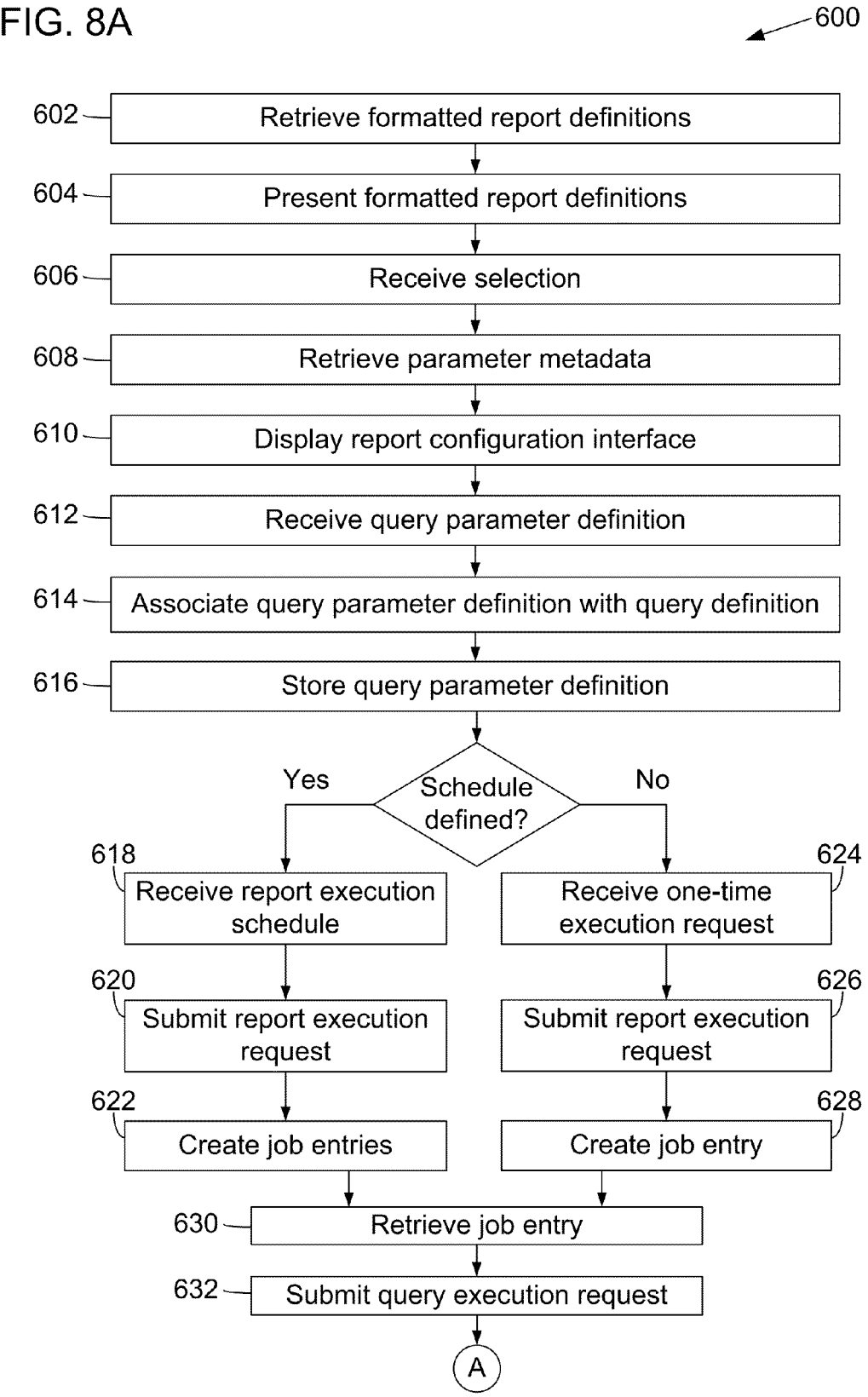
FIGS. 8A and 8B are a flowchart of an exemplary process for executing a report using the database query system.
Figure 8B:
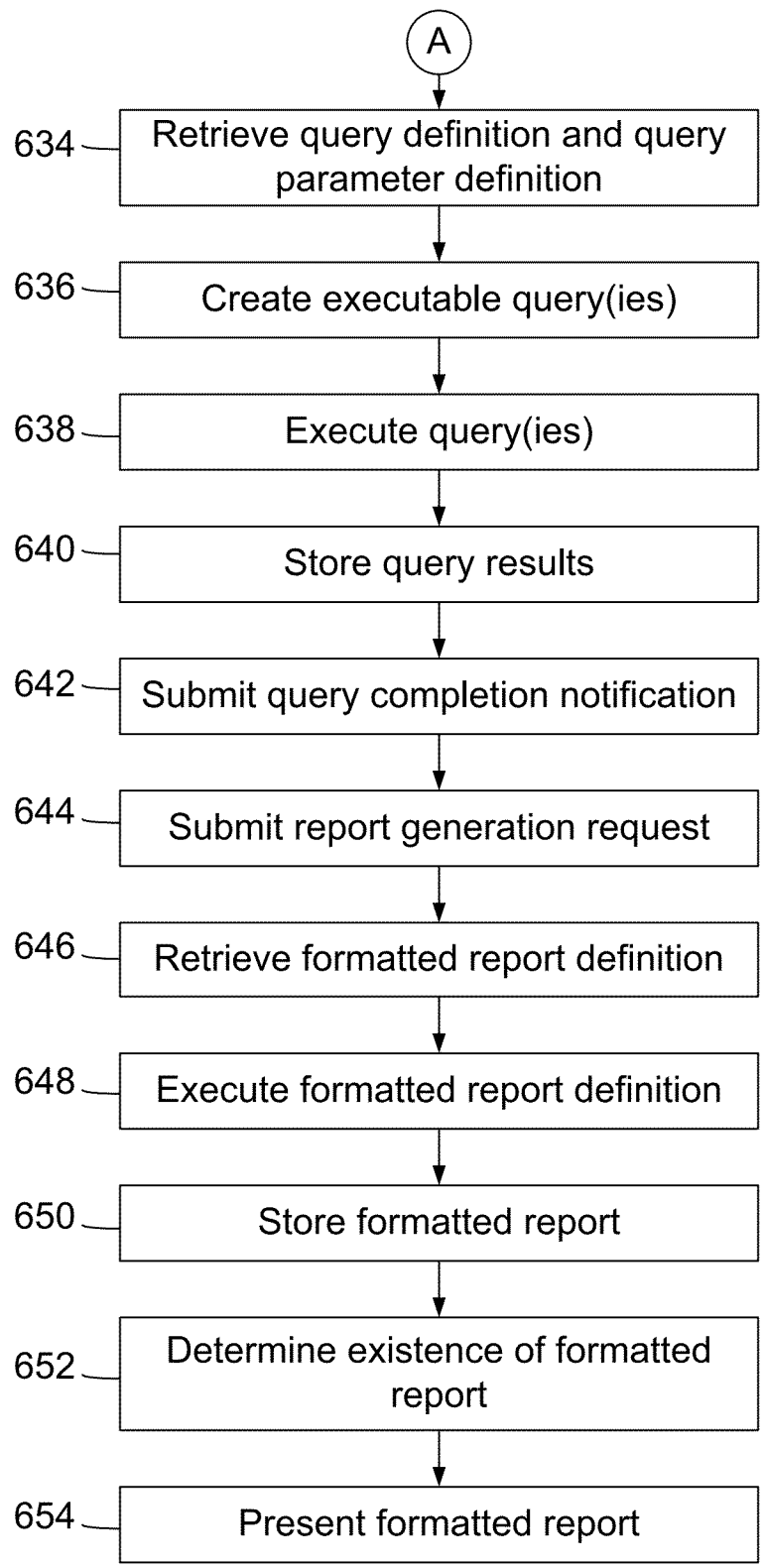

FIGS. 8A-8B provide a flowchart of an exemplary process 600 for executing a parameterized report using database query system 400 (shown in FIG. 6). In the exemplary embodiment, executing report process 600 is performed after making report available process 500.

Process 600 includes retrieving 602, by a third computing device, a list of available formatted report definitions from the second computing device. The list is presented 604 to a user by the third computing device, and a formatted report definition selection is received 606 by the third computing device.

Parameter metadata corresponding to the selected formatted report definition is retrieved 608 from the second computing device by the third computing device. A report configuration interface, based on the parameter metadata, is displayed 610 to the user by the third computing device. The report configuration interface allows the user to create and submit a query parameter definition, based on the parameter metadata, and, optionally, a report execution schedule. Specifically, the query parameter definition includes one or more parameter values for at least one parameter description.

The query parameter definition is received 612, associated 614 with the query definition, and stored 616 in the first database by the third computing device.

If defined, a report execution schedule is received 618 by the third computing device. A report execution request is submitted 620 to a fourth computing device by the third computing device. The report execution request includes the execution schedule, a reference to the formatted report definition, and a reference to the user. A job entry for each execution in the report execution schedule is created 622 in a third database by the fourth computing device. Each job entry includes a date and/or a time for execution, the reference to the formatted report definition, and the reference to the user.

In addition, or alternatively, third computing device receives 624 a one-time report execution request from the user. A report execution request is submitted 626 to the fourth computing device, including a reference to the formatted report definition and a reference to the user and specifying immediate execution. A single job entry is created 628 in the third database by the fourth computing device.

A job entry in the third database is retrieved 630 by a fifth computing device. A query execution request is submitted 632 to the first computing device by the fifth computing device. The query execution request includes the reference to the formatted report definition and the reference to the user from the retrieved job entry.

The query definition and the query parameter definition corresponding to the formatted report definition are retrieved 634 from the first database by the first computing device. At least one executable query is created 636 by the first computing device based on the tokenized query(ies) of the query definition and the query parameter definition. Each executable query is executed 638 against the data source associated with the corresponding tokenized query in the query definition, and the results of each executed query are stored 640 in a fourth database.

A query completion notification is submitted 642 to the fourth computing device by the first computing device. In an exemplary embodiment, the query completion notification includes a reference to the formatted report definition and a reference to the user. A report generation request, including the reference to the formatted report definition and the reference to the user, is submitted 644 to the second computing device by the fourth computing device.

The referenced formatted report definition is retrieved 646 from the second database and executed 648, using the query results in the fourth database as input, by the second computing device to create a formatted report. The formatted report is stored 650 in the second database. The existence of the formatted report is determined 652 (e.g., by requesting formatted reports for the user from the second computing device), and the formatted report is presented 654 to the user by the third computing device.

Figure 9:
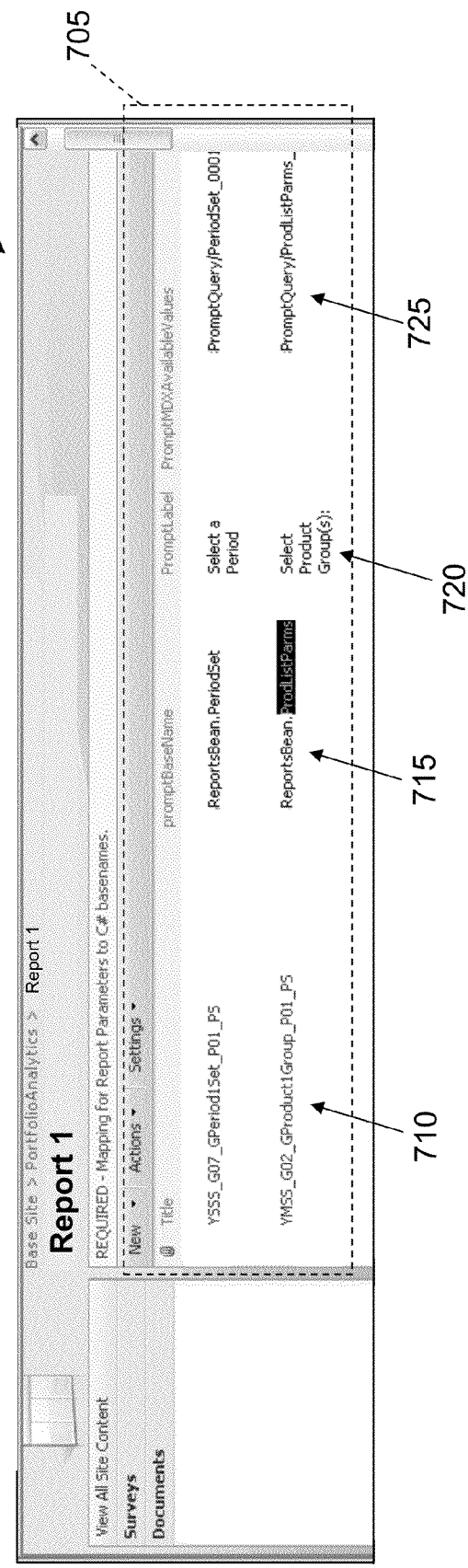
FIG. 9 is a screenshot of an exemplary user interface for defining parameter metadata for a query definition within the database query system.

FIG. 9 is a screenshot of an exemplary user interface 700 for defining parameter metadata for a query definition. User interface 700 includes a parameter table 705. Each row in table 705 represents a parameter description. In the exemplary embodiment, each row includes a parameter title 710, a parameter token identifier 715, a prompt label 720, and an available value indicator 725.

Figure 10:
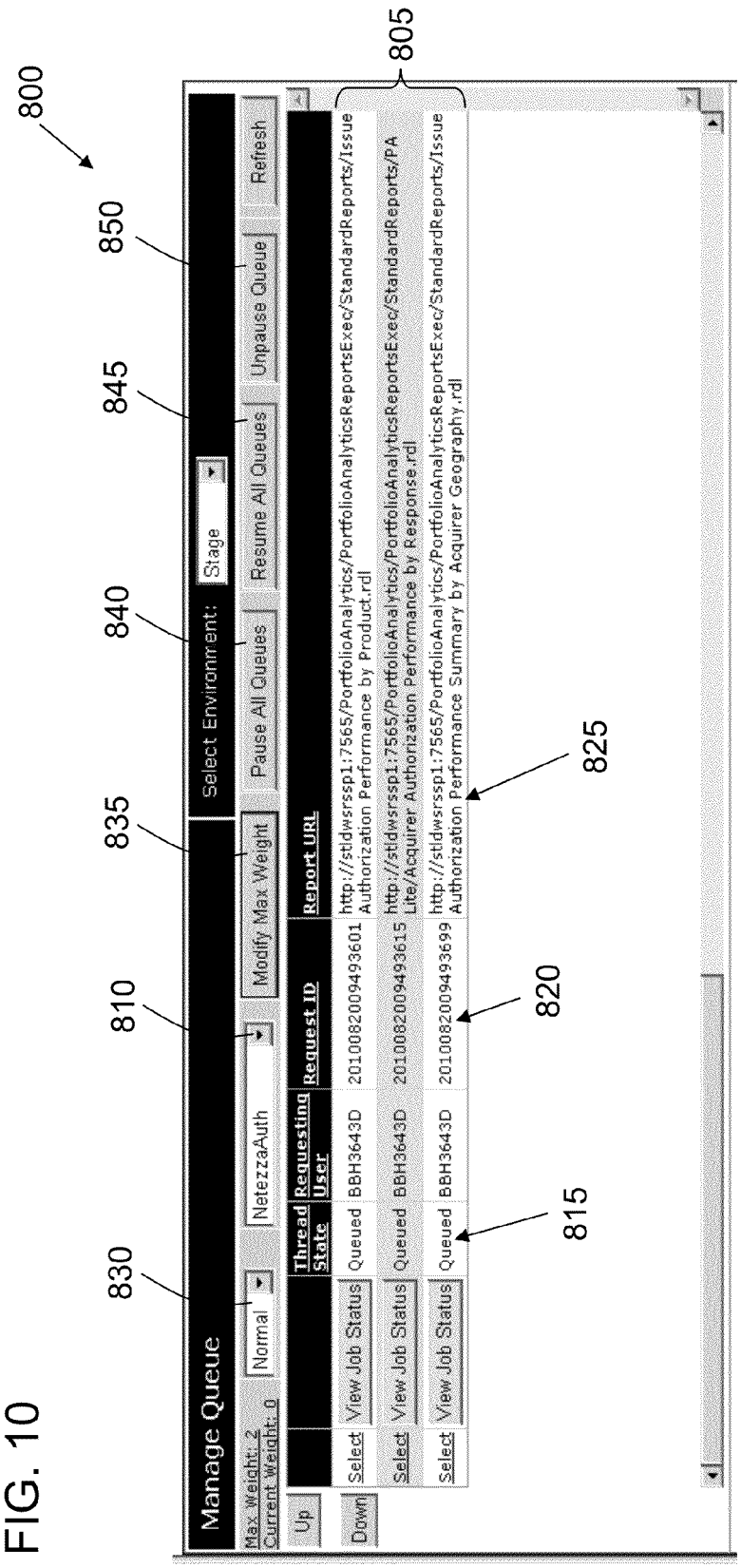
FIG. 10 is a screenshot of an exemplary user interface for viewing query execution entries in a query execution queue within the database query system.

FIG. 10 is a screenshot of an exemplary user interface 800 for viewing query execution entries 805 in a query execution queue. User interface 800 includes a queue selector 810, which enables a user to select a query execution queue provided by query manager 412 (shown in FIG. 6). In the exemplary embodiment, a query execution queue is defined for each data source.

When a query execution queue is selected in queue selector 810, user interface 800 displays query execution entries 805 associated with the selected queue. In the exemplary embodiment, for each query execution entry 805, user interface 800 displays a state 815 (e.g., queued or executing), a query execution entry identifier 820, and a report uniform resource locator (URL) 825 indicating a location of the report to be generated by the query execution entry 805.

User interface also includes a priority selector 830 and a weight selector 835. Using priority selector 830, a user may select an execution priority level for the query execution queue. For example, priority selector 830 may include a low priority, a normal priority, and a high priority. Weight selector 835 enables the user to define a weight for the query execution queue, specifying the maximum quantity of queries that are to be executed concurrently within the query execution queue.

Execution of queries may be controlled at run time via a pause all queues button 840, a resume all queues button 845, and an unpause queue button 850. When pause all button 840 is selected, query manager 412 continues executing any currently executing queries but refrains from beginning execution of any queued queries from any query execution queue. When resume all queues button 845 is selected, query manager 412 resumes executing queued queries in all query execution queues. When unpause queue button 850 is selected, query manager 412 resumes executing queued queries only in the query execution queue selected in queue selector 810.

Figure 11:
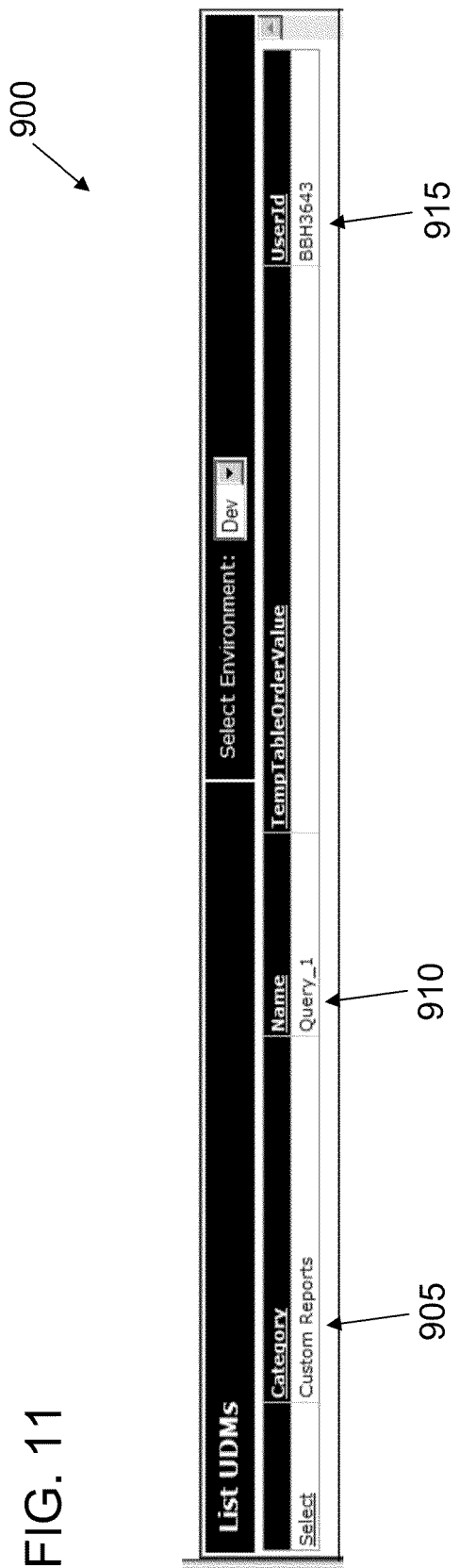
FIG. 11 is a screenshot of an exemplary user interface for viewing query definitions available from a query service within the database query system.

FIG. 11 is a screenshot of an exemplary user interface 900 for viewing query definitions available from query service 410. Each query definition is displayed with a category 905, a name 910, and a user identifier 915 indicating the user who created the query definition.

Figure 12:
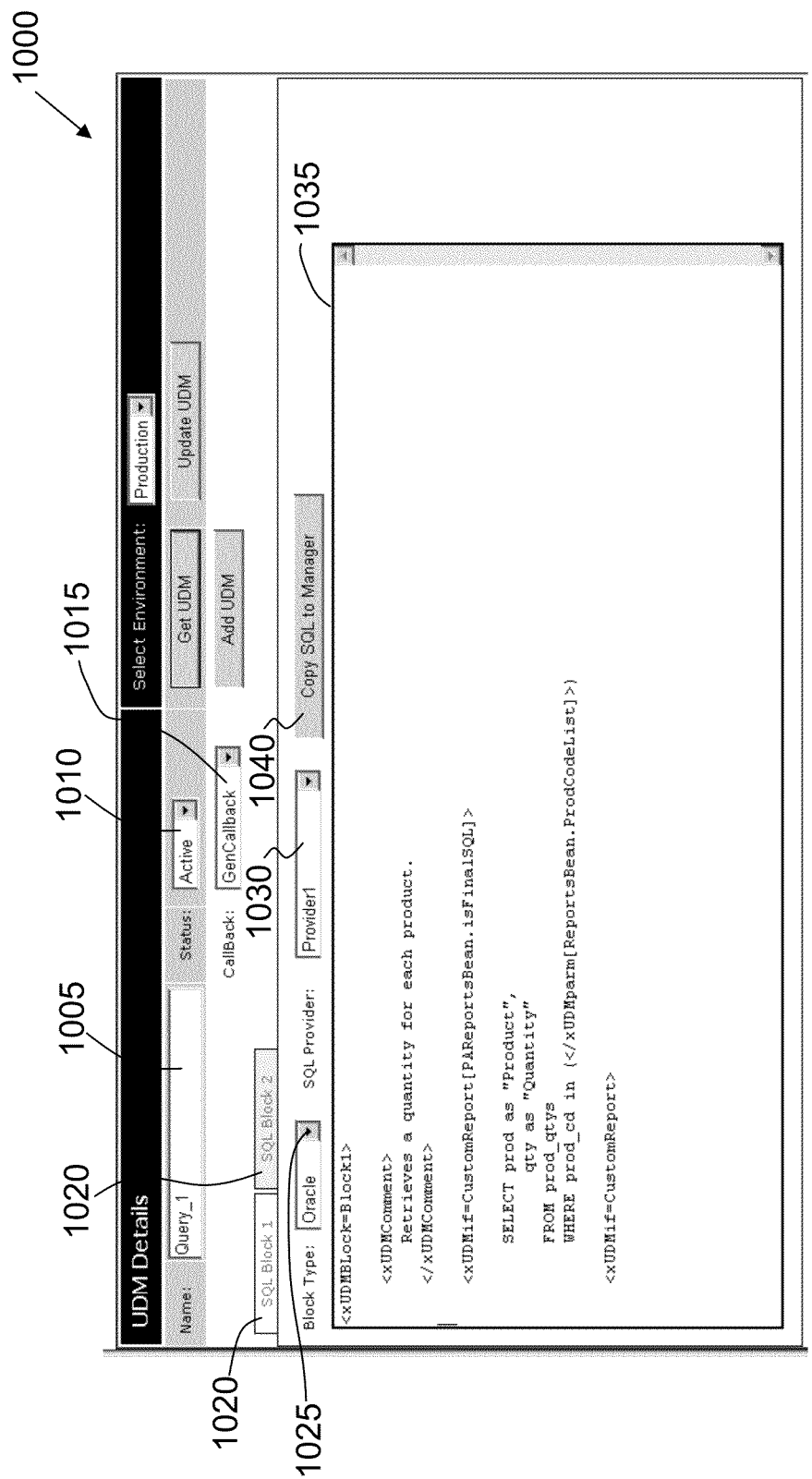
FIG. 12 is a screenshot of an exemplary user interface for viewing and/or submitting query definitions within the database query system.

FIG. 12 is a screenshot of an exemplary user interface 1000 for viewing and/or submitting query definitions. A user may view the user interface of FIG. 12 by selecting a query definition in user interface 900 (shown in FIG. 11), for example. User interface 1000 includes detailed information, such as a name 1005, a status 1010, and a callback reference 1015 (e.g., indicating a function to invoke upon completion of execution), for a query definition and a tabbed editor interface, with each tab 1020 corresponding to a query block of the displayed query definition.

Displayed within a tab 1020 is a query block type selector 1025, a data source selector 1030, a query block editor 1035, and a deploy (copy to manager) button 1040. Query block type selector 1025 enables a user to select a type of data source (e.g., an Oracle database or a Microsoft SQL Server database) against which a query block will be executed. Query manager 412 and/or parser 414 (shown in FIG. 6) may produce an executable query for a query block based at least in part on the selected query block type. For example, parser 414 may generate an executable query that conforms to syntax requirements associated with the selected query block type.

Data source selector 1030 enables the user to select the data source in database query system 400 (shown in FIG. 6) against which the query block will be executed. Query block editor 1035 includes the content of the query block, which may be edited by the user. When deploy button 1040 is selected, query manager stores the query definition and makes the query definition available for use in reports.

Figure 13:
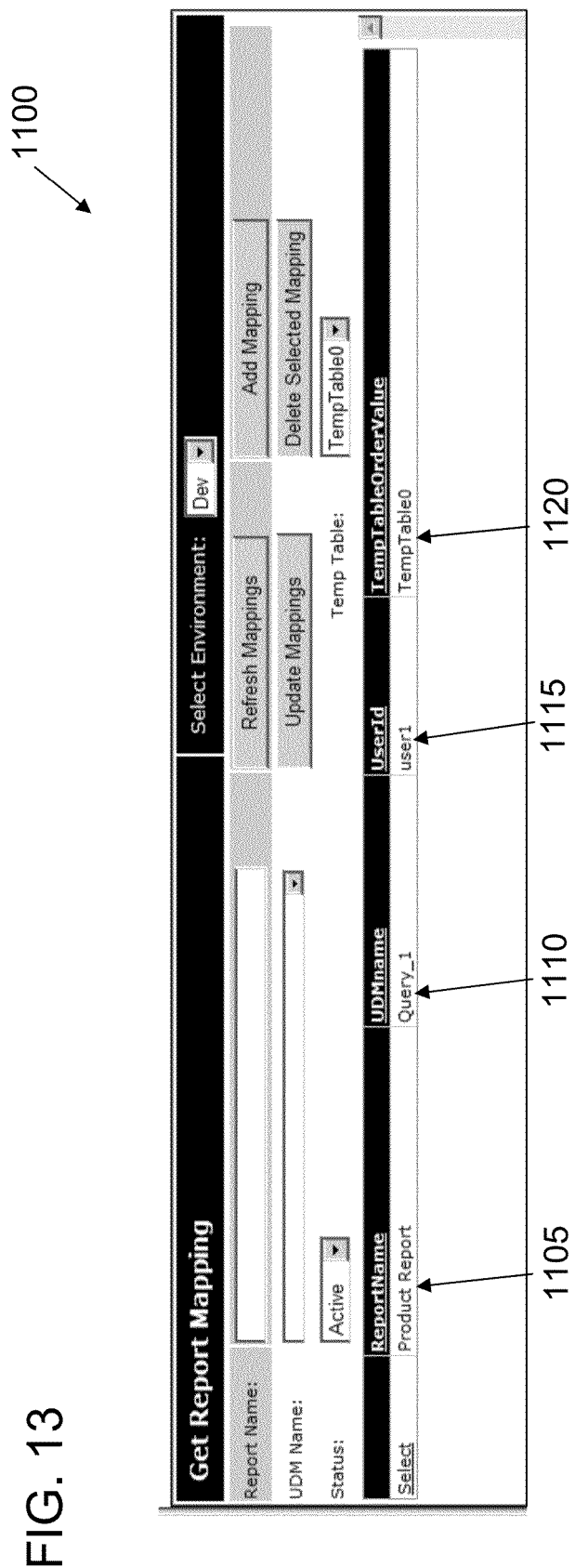
FIG. 13 is a screenshot of an exemplary user interface for associating a formatted report definition with a query definition within the database query system.

FIG. 13 is a screenshot of an exemplary user interface 1100 for associating a formatted report definition with a query definition. A query definition may be associated with multiple formatted report definitions. For example, a query definition that produces a large set of numeric data may be associated with a first formatted report definition for calculating summary data based on the numeric data and may also be associated with a second formatted report definition for displaying the numeric data as a graph, such as a scatter plot.

In the exemplary embodiment, user interface 1100 displays each formatted report definition with a report name 1105, a query definition name 1110, a user identifier 1115 indicating the user who created the formatted report definition, and a temporary database table name 1120 indicating a database table in which temporary data related to the formatted report and/or to the query definition is stored.

Figure 14:
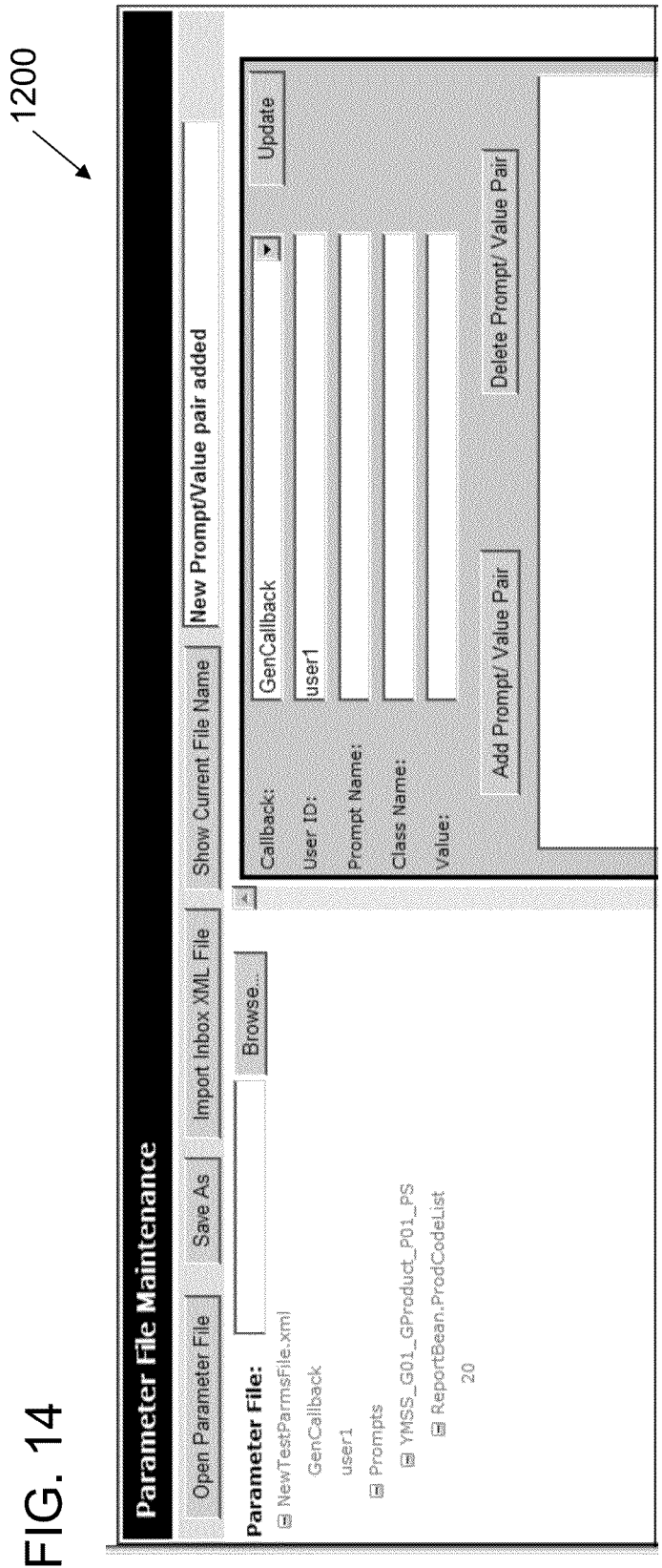
FIG. 14 is a screenshot of an exemplary user interface for defining a test query parameter definition within the database query system.

FIG. 14 is a screenshot of an exemplary user interface 1200 for defining a test query parameter definition. Query service 410 and/or query manager 412 may provide user interface 1200 for defining a test query parameter definition to facilitate testing a query definition. Specifically, executable queries may be generated based on a query definition and a test query parameter definition to avoid the effort of creating both parameter metadata and a query parameter definition.

Figure 15:
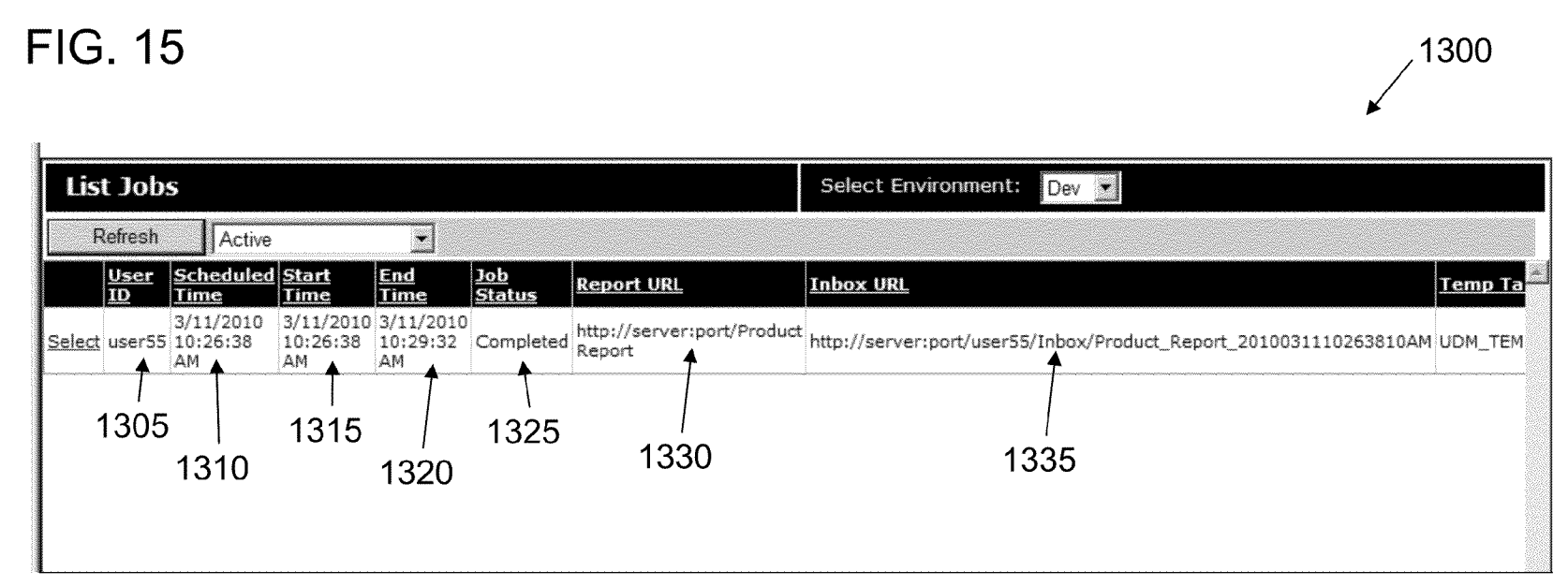

FIG. 15 is a screenshot of an exemplary user interface 1300 for viewing job entries from job scheduler 434. Detailed information for each job entry is displayed, including a user identifier 1305 associated with the job, a scheduled time of execution 1310, an execution start time 1315, an execution end time 1320, a job status 1325, a uniform resource locator (URL) 1330 for the report to be generated by the job, and a URL 1335 of the message inbox of the user associated with the job.

Figure 16:
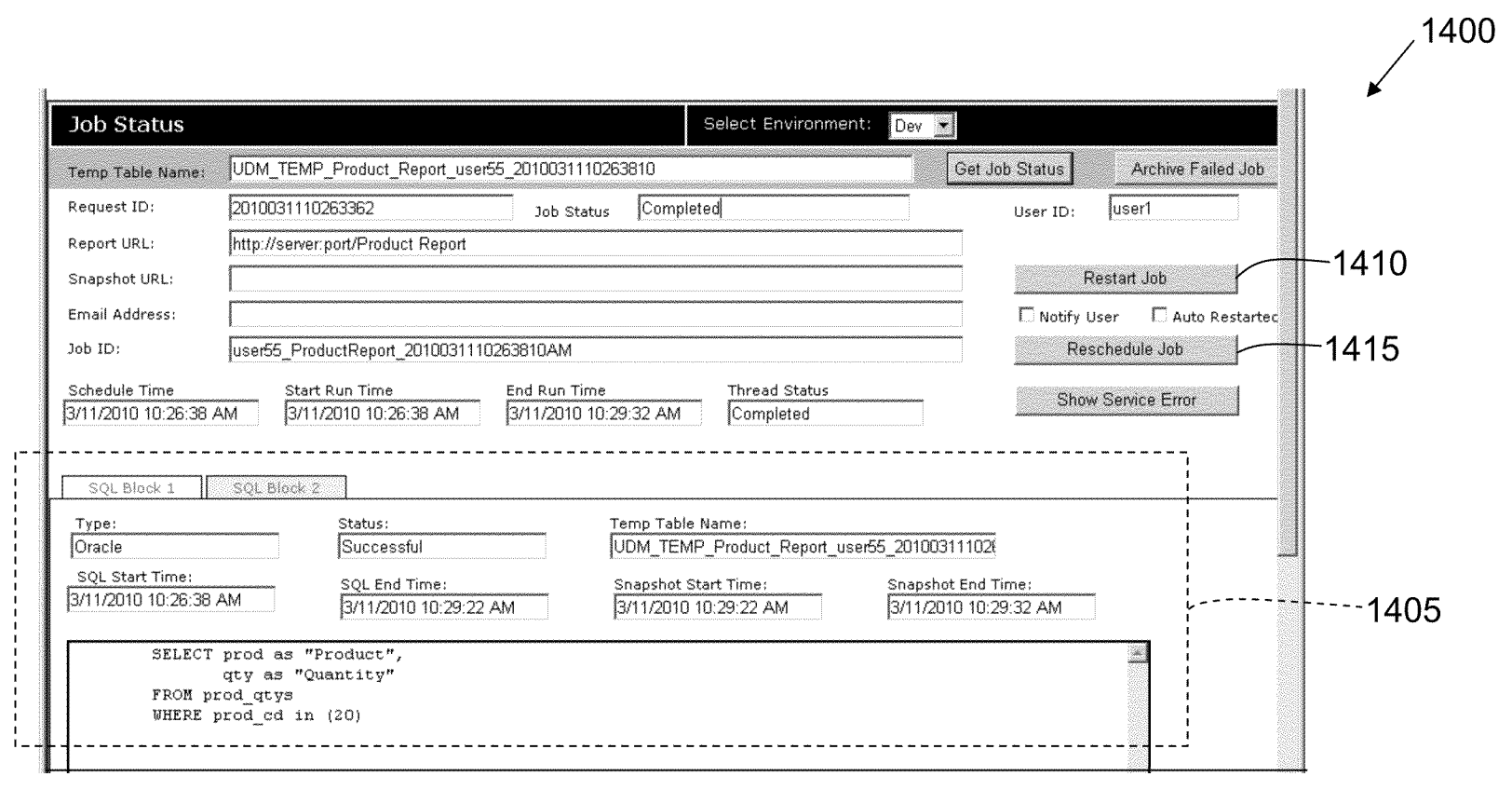

FIG. 16 is a screenshot of an exemplary user interface 1400 for viewing and manipulating a job entry, including executable query details. A user may access user interface 1400 by selecting a job entry in user interface 1300 (shown in FIG. 15), for example.

Additional details for a job are displayed in user interface 1400. Specifically, user interface 1400 displays a tabbed executable query viewing interface 1405, similar to user interface 1200 (shown in FIG. 10), which displays executable queries generated from the query definition associated with the job. In addition, user interface 1400 includes a restart button 1410 enabling a user to restart the job and a reschedule button 1415 enabling the user to schedule the job to execute at another time.

FIGS. 17-22 illustrate an exemplary query design feature. In one embodiment, user interfaces shown in FIGS. 17-22 are provided to a user by query developer user interface 415 (shown in FIG. 6).

Figure 17:
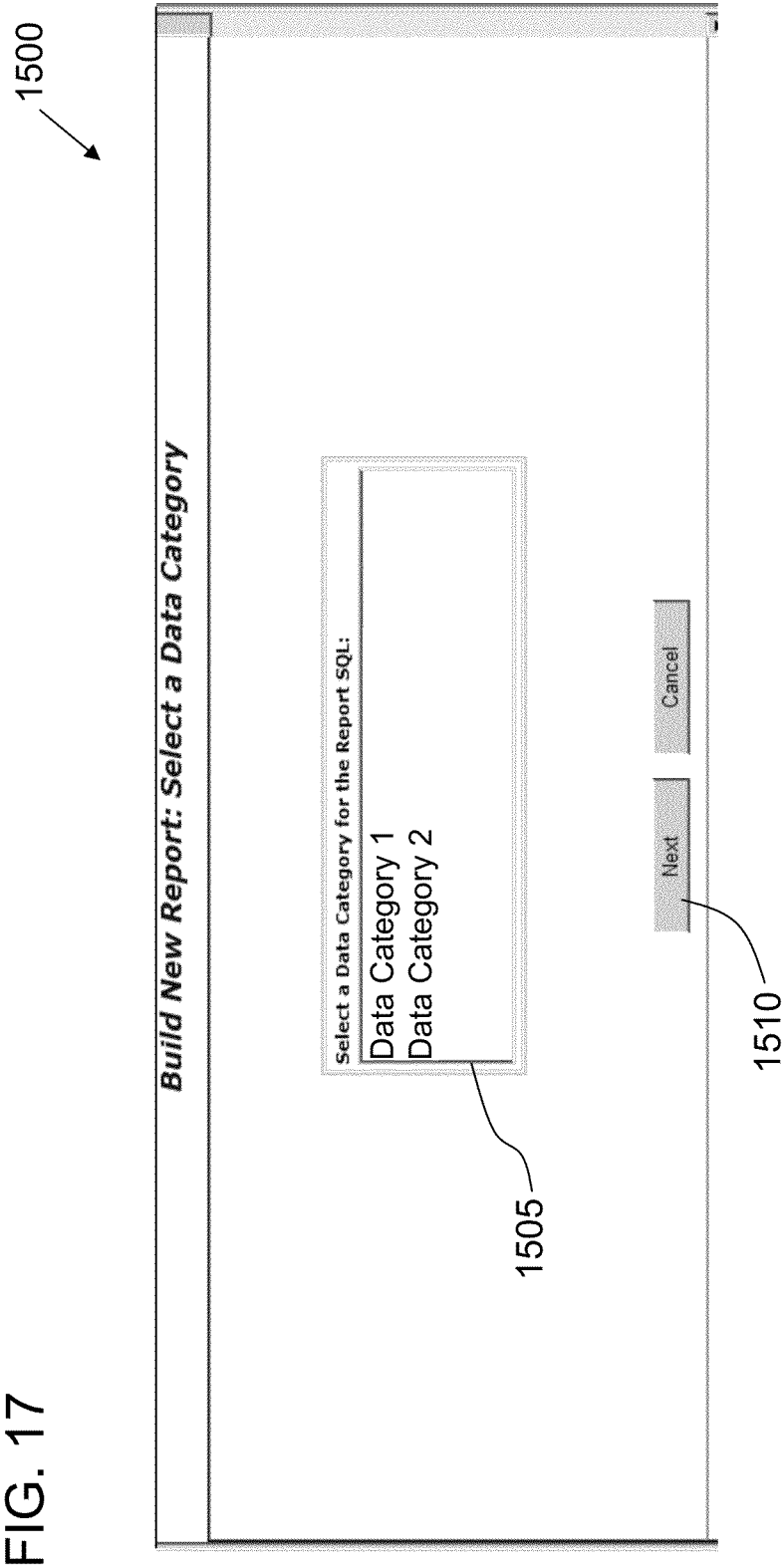
FIG. 17 is a screenshot of an exemplary user interface for selecting a data category for which to create a query definition.

FIG. 17 is a screenshot of an exemplary user interface 1500 for selecting a data category for creating a query definition. For example, in the context of payment transaction information, available data categories may include clearing data, authorization data, and/or merchant data. A user selects a data category from a data category selector 1505 and selects a next button 1510.

Figure 18:
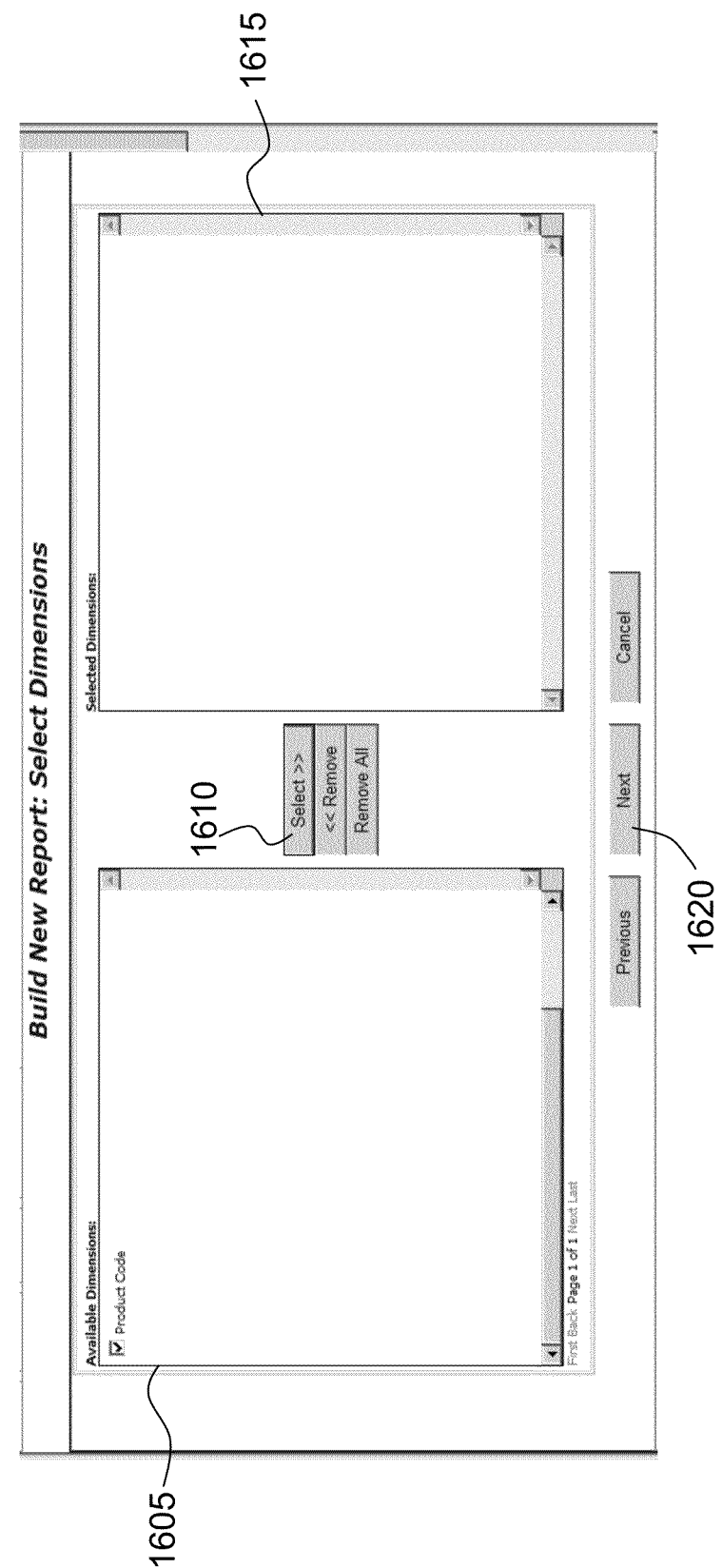
FIG. 18 is a screenshot of an exemplary user interface for selecting data fields or "dimensions" to be available for inclusion in a report.

FIG. 18 is a screenshot of an exemplary user interface 1600 for selecting data fields or "dimensions" to be available for inclusion in a report. User interface 1600 is displayed in response to the user selecting next button 1510 in user interface 1500 (shown in FIG. 17). User interface 1600 displays within an available dimensions list 1605 a set of available dimensions based on the data category selected in user interface 1500. When a user selects one or more dimensions and clicks a select button 1610, the selected dimensions are displayed in a selected dimensions list 1615. The user may select a next button 1620 to advance.

Figure 19:
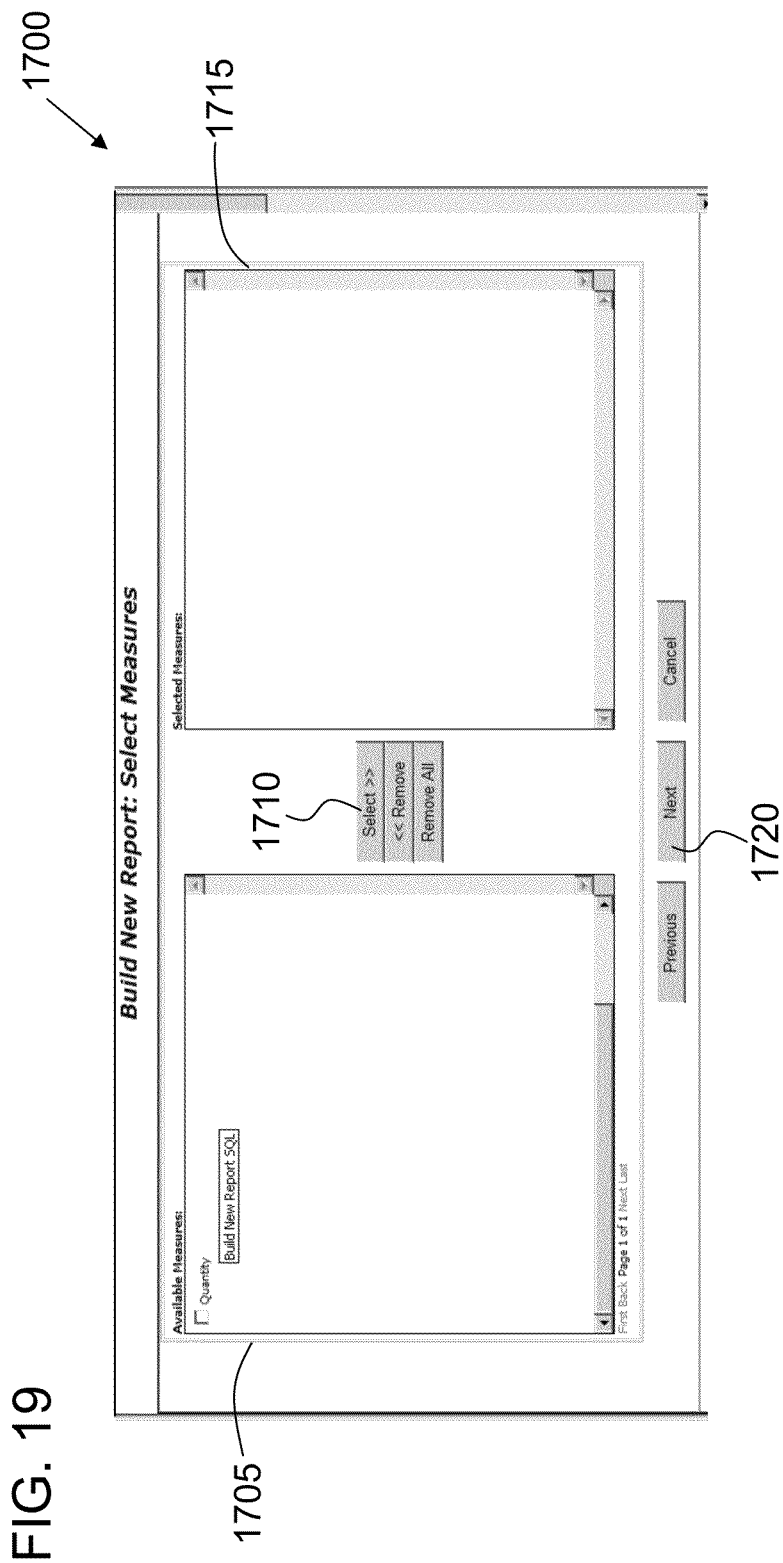
FIG. 19 is a screenshot of an exemplary user interface for selecting measures.

FIG. 19 is a screenshot of an exemplary user interface 1700 for selecting measures. User interface 1700 is displayed in response to the user selecting next button 1620 in user interface 1600 (shown in FIG. 18). User interface 1700 displays within an available measures list 1705 a set of available measures based on the dimensions selected in user interface 1600. Measures may include a unit of measure related to a selected dimension and/or a conversion to apply to a selected dimension (e.g., from one form of currency to another). When the user selects one or more measures and clicks a select button 1710, the selected measures are displayed within a selected measures list 1715. The user may select a next button 1720 to advance.

Figure 20:
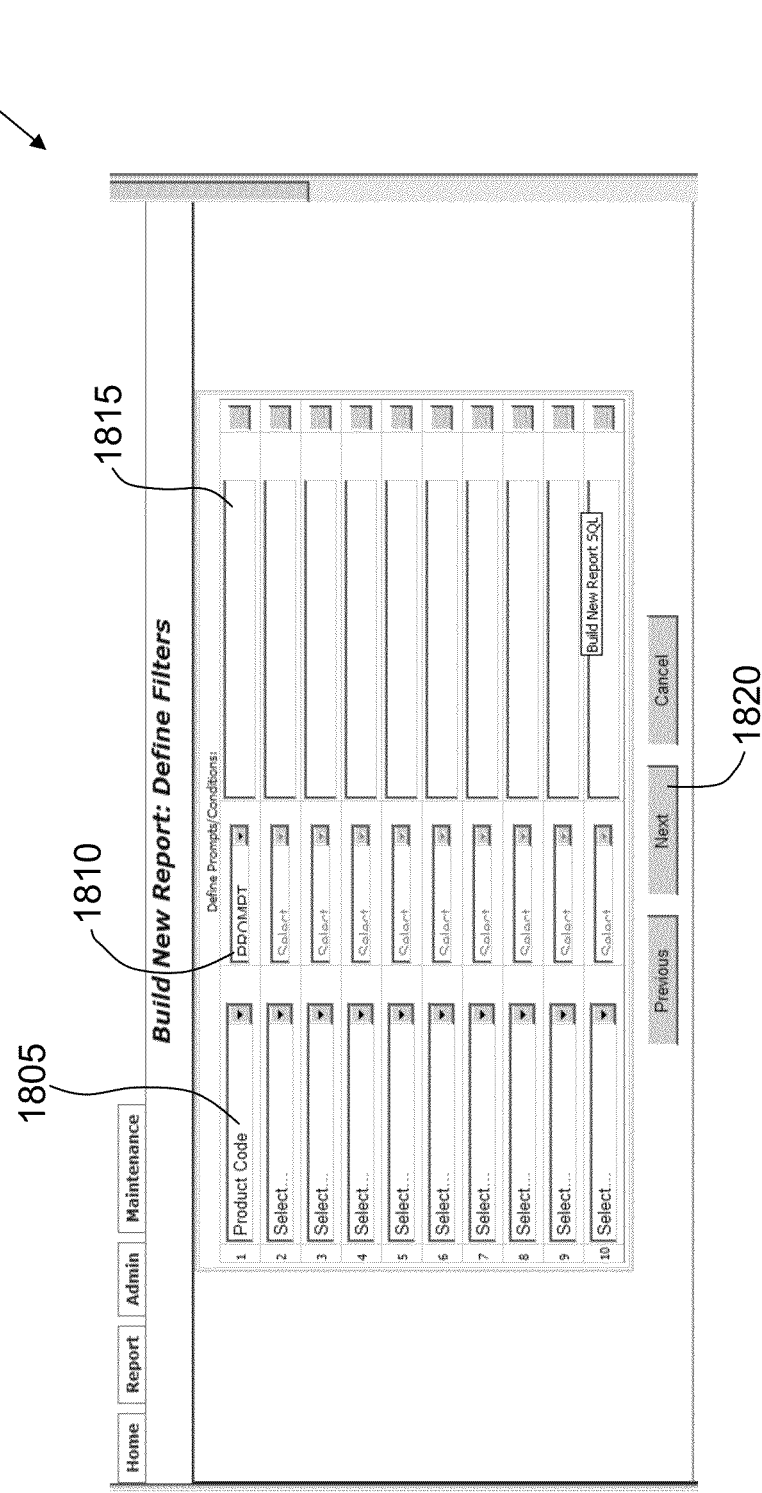
FIG. 20 is an exemplary user interface for defining filters to apply to a query definition.

FIG. 20 is an exemplary user interface 1800 for defining filters to apply to a query definition. User interface 1800 is displayed in response to the user selecting next button 1720 (shown in FIG. 19). User interface 1800 displays a dimension selector 1805, an action selector 1810, and a value field 1815. Dimension selector 1805 includes a list of all dimensions selected in user interface 1600 (shown in FIG. 18). For any of the dimensions, an action may be selected in action selector 1810. For example, available actions may include "PROMPT" and "SET". If an action of PROMPT is selected, the user may enter prompt text in value field 1815. The prompt text may later be displayed to prompt a user to enter a parameter value corresponding to the dimension. When an action of SET is selected, the user may enter a static parameter value in value field 1815. A plurality of filters may be defined in user interface 1800. The user may select a next button 1820 to advance.

Figure 21:
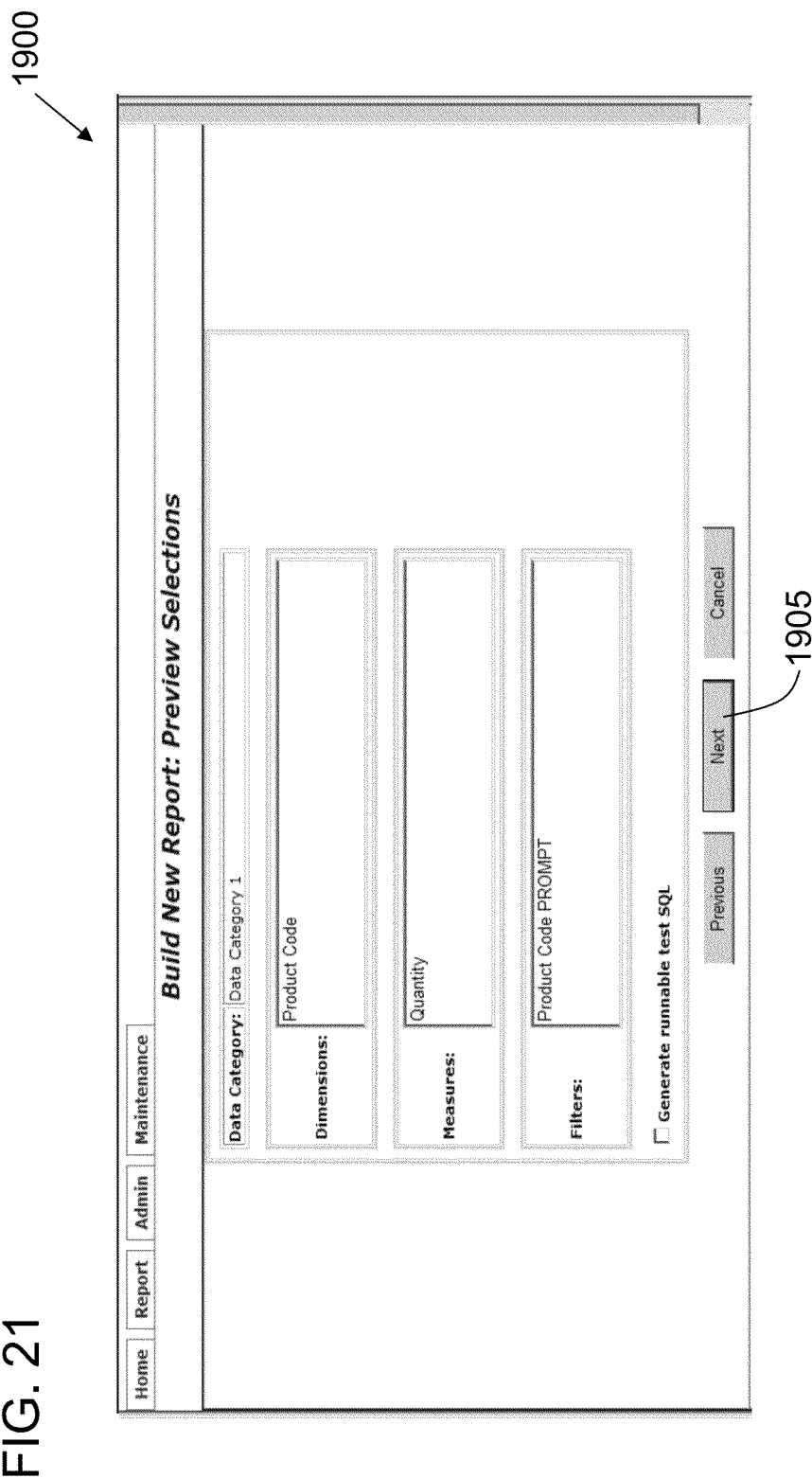
FIG. 21 is an exemplary user interface for previewing a query definition.

FIG. 21 is an exemplary user interface 1900 for previewing a query definition. User interface 1900 is displayed in response to the user selecting next button 1820 in user interface 1800 (shown in FIG. 20). Providing a preview enables the user to confirm the selections made prior to saving changes. Upon confirming the selections, the user may select a next button 2105 to advance.

Figure 22:
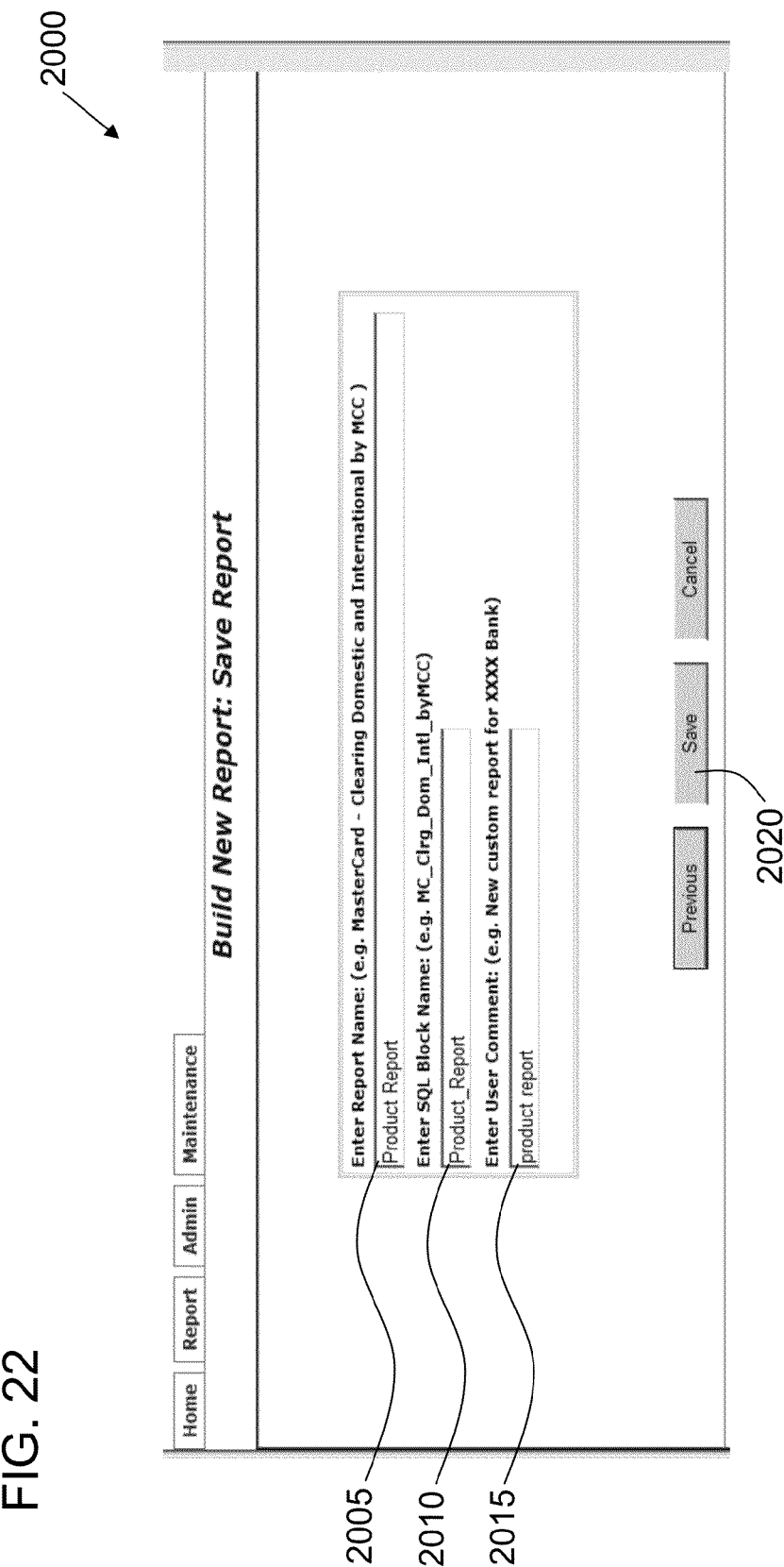
FIG. 22 is an exemplary user interface for saving a report.

FIG. 22 is an exemplary user interface 2000 for saving a report. User interface 2000 is displayed in response to the user selecting next button 2105 (shown in FIG. 21). User interface 2000 includes a report name field 2005, a query block name field 2010, and a comment field 2015. The user may enter values for the query definition and/or the report in these fields and select a save button 2020 to advance. In response to the user selecting next button 2020, query code and report mappings (e.g., as shown in FIG. 13) are generated based on metadata that corresponds to the selections made by the user.

Figure 23:
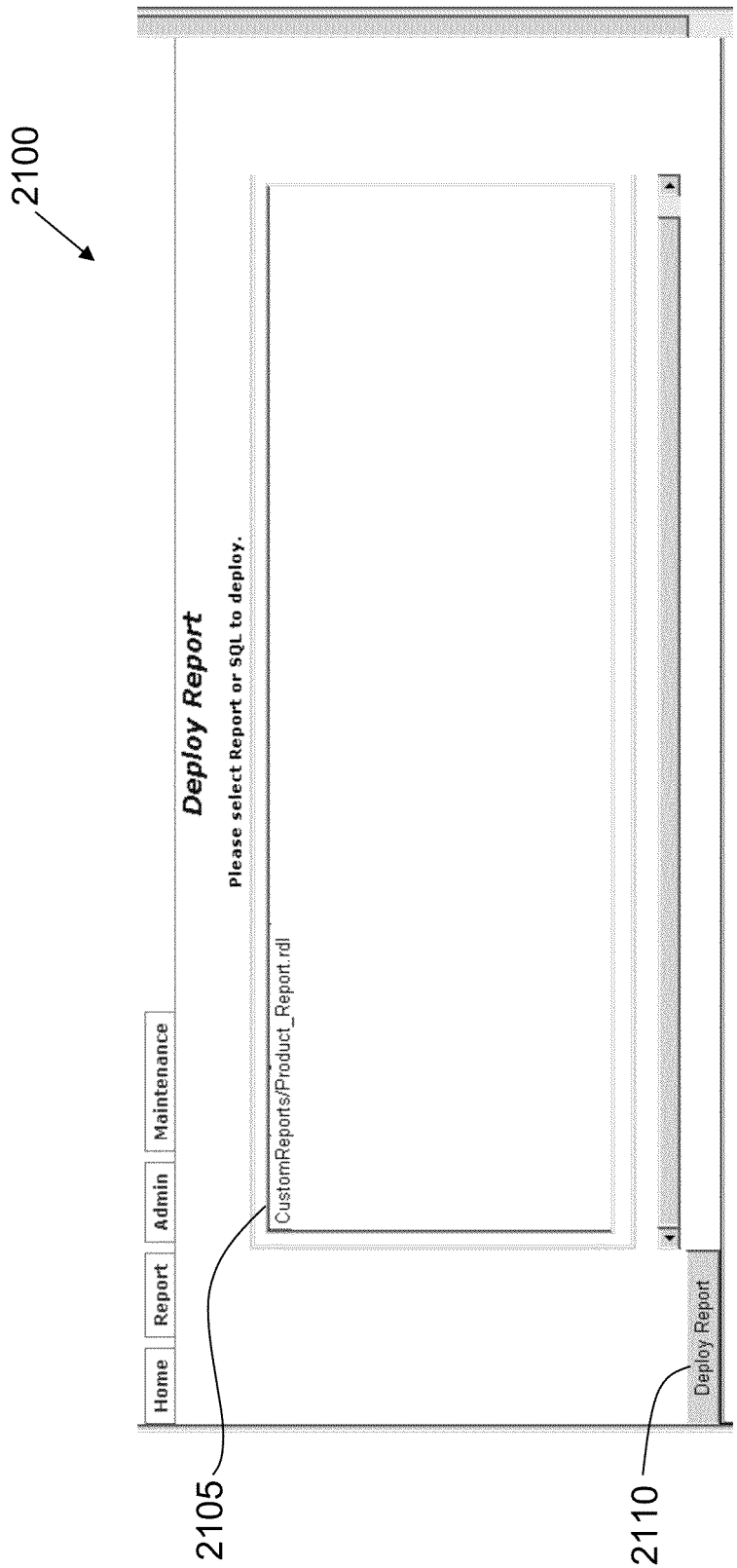
FIG. 23 is an exemplary user interface for deploying a report.

FIG. 23 is an exemplary user interface 2100 for deploying a report. User interface 2100 includes a report list 2105 that displays formatted report definitions that are available for deployment. A user may select one or more formatted report definitions in report list 2105 and select a deploy report button 2110. In response to the user selecting deploy report button 2110, the selected formatted report definitions and any corresponding query definitions, executable queries, report mappings, and/or parameter definitions are deployed (e.g., copied) to a live or "production" environment in which actual transaction data is accessible.

In the exemplary embodiment, a user interface is provided for viewing a message inbox with formatted reports. The message inbox includes completed formatted reports and may also include pending or currently executing reports as well as reports scheduled to execute in the future. A user interface is also provided for viewing and selecting available formatted report definitions. Report definitions are displayed by group or category and may be further subdivided into subgroups or subcategories. Only formatted report definitions for which the user has been authorized or licensed are displayed.

The exemplary embodiment also provides a report configuration user interface for defining a query parameter definition and an execution schedule. The report configuration interface includes prompts based on parameter descriptions from parameter metadata. For example, a parameter description may include a prompt label and a value type for a given parameter, in which case report configuration user interface displays a textual label based on the prompt label and an input control based on the value type.

A user interface may also be provided for viewing a formatted report. A formatted report may include a plurality of sections, in which case the user interface displays a list of section titles. In response to the user selecting a section title, the user interface scrolls or adjusts the viewport to display the section of the report corresponding to the title.

In some embodiments, two or more of the first computing device, second computing device, third computing device, fourth computing device, and fifth computing device are consolidated into a single computing device. For example, a job execution server may perform the functions described with regard to the fourth and fifth computing devices.

Similarly, in some embodiments, two or more of the first database, second database, third database, and fourth database are consolidated into a single database.

While the invention has been described in terms of various specific embodiments, those skilled in the art will recognize that the invention can be practiced with modification within the spirit and scope of the claims.

What is claimed is:

1. A system for retrieving data from a plurality of data sources, said system comprising:
   a first data source for storing first data;
   a second data source for storing second data; and
   a server computing device in communication with the first data source and the second data source, the server computing device programmed to:
      receive a query execution request comprising a query definition reference and a query parameter definition, wherein the query definition reference corresponds to a query definition that includes a first query block and a second query block;
      create a first executable query based on the first query block and the query parameter definition;
      create a second executable query based on the second query block and the query parameter definition;
      determine an amount of data each of the first executable query and the second executable query are known to access;
      assign a priority level to each of the first executable query and the second executable query based on the determined amount of data each of the first executable query and the second executable query are known to access; and
      concurrently execute the first executable query at the first data source to create first query results and the second executable query at the second data source to create second query results based on the assigned priority level of the first executable query and the second executable query.

2. The system of claim 1, further comprising a query results database in communication with the server computing device, wherein the server computing device is further programmed to store the first query results and the second query results in the query results database.

3. The system of claim 2, further comprising a report generation service configured to:
   retrieve the first query results and the second query results from the query results database; and
   generate a formatted report based on the first query results, the second query results, and a formatted report definition that is associated with the query definition.

4. The system of claim 1, wherein server computing device is further programmed to:

create the first executable query in a first syntax that is compatible with the first data source; and create the second executable query in a second syntax that is compatible with the second data source, wherein the second syntax is different from the first syntax.

5. The system of claim 1, wherein the query execution request further comprises an execution schedule that includes a plurality of execution times, and the server computing device is further programmed to execute the first executable query and the second executable query at a first execution time of the plurality of execution times.

6. The system of claim 1, wherein the first query block includes at least one control token and a reference to the first data source, and the second query block includes at least one control token and a reference to the second data source.

7. The system of claim 6, wherein the server computing device is further programmed to:
create the first executable query at least in part by replacing the control token of the first query block with a first value from the query parameter definition; and
create the second executable query at least in part by replacing the control token of the second query block with a second value from the query parameter definition.

8. The system of claim 1, wherein said server computing device is further programmed to:
assign the first executable query to a first query execution queue having a first weight;
assign the second executable query to a second query execution queue having a second weight that is less than the first weight; and
execute the first executable query prior to executing the second executable query based on the first weight and the second weight.

9. The system of claim 1, further comprising:
a first query execution queue associated with the first data source, the first query execution queue having a first weight that defines a maximum quantity of query execution entries within the first query execution queue that may be processed concurrently; and
a second query execution queue associated with the second data source, the second query execution queue having a second weight that defines a maximum quantity of query execution entries within the second query execution queue that may be processed concurrently.

10. The system of claim 1, wherein the query definition reference corresponds to a query definition that further includes a third query block and a fourth query block, and wherein the server computing device is further programmed to:
create a third executable query based on the third query block and the query parameter definition;
create a fourth executable query based on the fourth query block and the query parameter definition;
determine an amount of data each of the third executable query and the fourth executable query are known to access;
assign a priority level to each of the third executable query and the fourth executable query based on the determined amount of data each of the third executable query and the fourth executable query are known to access; and
based on the assigned priority level of the first executable query, the second executable query, the third executable query, and the fourth executable query, execute the third executable query at the first data source to create third query results and the fourth executable query at the second data source to create fourth query results after concurrently executing the first executable query and the second executable query.

11. A method for retrieving data from a plurality of data sources using a computing device, the computing device in communication with a first data source and a second data source of the plurality of data sources, said method comprising:
electronically retrieving a query definition corresponding to a query definition reference, the query definition including a first query block associated with the first data source and a second query block associated with the second data source;
creating, using the computing device, a first executable query based on the first query block and a query parameter definition;
creating, using the computing device, a second executable query based on the second query block and the query parameter definition;
determining an amount of data each of the first executable query and the second executable query are known to access;
assigning a priority level to each of the first executable query and the second executable query based on the determined amount of data each of the first executable query and the second executable query are known to access;
concurrently executing, using the computing device, the first executable query against the first data source to create first query results and the second executable query against the second data source to create second query results based on the assigned priority level of the first executable query and the second executable query; and
storing the first and the second query results in a query results database.

12. The method of claim 11, further comprising:
retrieving a formatted report definition associated with the query definition; and
executing, using the computing device, the formatted report definition on the first and the second query results in the query results database to create a formatted report.

13. The method of claim 11, further comprising receiving from a user a query execution request including a reference to a formatted report definition, wherein said retrieving a query definition comprises identifying the query definition that is associated with the received formatted report definition.

14. The method of claim 13, further comprising:
receiving an execution schedule associated with the query execution request, the execution schedule specifying a plurality of executions of the formatted report definition; and
performing said steps of executing the first executable query, executing the second executable query, and storing the first and the second query results at a plurality of times based on the execution schedule.

15. The method of claim 13, wherein the query execution request is a first query execution request, the first query execution request including a reference to a first formatted report definition associated with a first query definition, said method further comprising:
adding the first query execution request to a query execution queue;
receiving, after said receiving the first query execution request, a second query execution request including a reference to a second formatted report definition associated with a second query definition;

adding the second query execution request to the query execution queue; and executing executable queries based on the second query definition after said storing the first and the second query results corresponding to the first query definition.

16. The method of claim 13, wherein the query execution request is a first query execution request, the first query execution request including a reference to a first formatted report definition associated with a first query definition, said method further comprising:

receiving, after said receiving the first query execution request, a second query execution request including a reference to a second formatted report definition associated with a second query definition; and concurrently executing the first and the second executable queries and a plurality of executable queries corresponding to the second query definition.

17. The method of claim 11, further comprising:

submitting the first executable query to a first query execution queue having a first weight;

submitting the second executable query to a second query execution queue having a second weight that is less than the first weight; and executing the first executable query prior to executing the second executable query based on the first weight and the second weight.

18. The method of claim 11, wherein said creating the first executable query comprises creating the first executable query based further on a first syntax associated with the first data source, and said creating the second executable query comprises creating the second executable query based further on a second syntax associated with the second data source, wherein the second syntax is different from the first syntax.

19. A computer system for retrieving data from a plurality of data sources, said computer system comprising:

a first computer device;

a query database in communication with the first computer device, the query database configured to store a plurality of query definitions, wherein a first query definition of the plurality of query definitions comprises a first query block including a reference to a first data source and a second query block including a reference to a second data source;

a query service executed by the first computer device, the query service configured to instruct the first computer device to:

create a first executable query based at least in part on the first query block and a second executable query based at least in part on the second query block;

determine an amount of data each of the first executable query and the second executable query are known to access;

assign a priority level to each of the first executable query and the second executable query based on the determined amount of data each of the first executable query and the second executable query are known to access;

concurrently execute the first executable query at the first data source to create first query results and the second executable query at the second data source to create second query results based on the assigned priority level of the first executable query and the second executable query; and a query results database configured to store the first query results and the second query results.

20. The system of claim 19, further comprising a query developer user interface configured to receive the first query definition from a user, and transmit the first query definition to the first computer device.

21. The system of claim 19, further comprising a second computer device, and a report generation service executed by the second computer device, wherein the report generation service is configured to instruct the second computer device to create a formatted report based on a formatted report definition associated with the first query definition, the first query results, and the second query results.

22. A non-transitory computer-readable medium that includes computer executable instructions for retrieving data from a plurality of data sources, said computer executable instructions configured to instruct a computing device to:

retrieve a query definition corresponding to a query definition reference, the query definition including a first query block associated with a first data source of the plurality of data sources and a second query block associated with a second data source of the plurality of data sources;

create a first executable query based on the first query block and a query parameter definition;

create a second executable query based on the second query block and the query parameter definition;

determine an amount of data each of the first executable query and the second executable query are known to access;

assign a priority level to each of the first executable query and the second executable query based on the determined amount of data each of the first executable query and the second executable query are known to access;

concurrently execute the first executable query against the first data source to create first query results and execute the second executable query against the second data source to create second query results based on the assigned priority level of the first executable query and the second executable query; and create a formatted report based on the first query results, the second query results, and a formatted report definition associated with the query definition.

23. A system for retrieving data from a plurality of data sources, said system comprising:

a first data source for storing first data;

a second data source for storing second data;

a first query execution queue associated with the first data source, the first query execution queue having a first weight that defines a maximum quantity of query execution entries within the first query execution queue that may be processed concurrently;

a second query execution queue associated with the second data source, the second query execution queue having a second weight that defines a maximum quantity of query execution entries within the second query execution queue that may be processed concurrently; and a server computing device in communication with the first data source and the second data source, the server computing device programmed to:

receive a query execution request comprising a query definition reference and a query parameter definition, wherein the query definition reference corresponds to a query definition that includes a first query block and a second query block;

create a first executable query based on the first query block and the query parameter definition;

create a second executable query based on the second query block and the query parameter definition; and concurrently execute the first executable query at the first data source to create first query results and the second executable query at the second data source to create second query results.

24. A computer system for retrieving data from a plurality of data sources, said computer system comprising:
- a first computer device;
- a query database in communication with the first computer device, the query database configured to store a plurality of query definitions, wherein a first query definition of the plurality of query definitions comprises a first query block including a reference to a first data source and a second query block including a reference to a second data source;
- a first query execution queue associated with the first data source, the first query execution queue having a first weight that defines a maximum quantity of query execution entries within the first query execution queue that may be processed concurrently;
- a second query execution queue associated with the second data source, the second query execution queue having a second weight that defines a maximum quantity of query execution entries within the second query execution queue that may be processed concurrently;
- a query service executed by the first computer device, the query service configured to instruct the first computer device to:
- create a first executable query based at least in part on the first query block and a second executable query based at least in part on the second query block; and
- concurrently execute the first executable query at the first data source to create first query results and the second executable query at the second data source to create second query results; and
- a query results database configured to store the first query results and the second query results.

25. A method for retrieving data from a plurality of data sources using a computing device, the computing device in communication with a first data source and a second data source of the plurality of data sources, said method comprising:

receiving, from a user, a first query execution request including a reference to a first formatted report definition associated with a first query definition;

receiving, after receiving the first query execution request, a second query execution request including a reference to a second formatted report definition associated with a second query definition;

electronically retrieving the first query definition and the second query definition, the first query definition being associated with the first formatted report definition and the second query definition being associated with the second formatted report definition, the first query definition including a first query block associated with the first data source and a second query block associated with the second data source, and the second query definition including a third query block associated with the first data source and a fourth query block associated with the second data source;

creating, using the computing device, a first executable query based on the first query block and the first query parameter definition;

creating, using the computing device, a second executable query based on the second query block and the first query parameter definition;

creating, using the computing device, a third executable query based on the third query block and the second query parameter definition;

creating, using the computing device, a fourth executable query based on the fourth query block and the second query parameter definition;

concurrently executing, using the computing device, the first executable query and the third executable query against the first data source and the second executable query and the fourth executable query against the second data source; and storing results of the concurrent execution in a query results database.

* * * * *